(12) United States Patent
Ohgi

(10) Patent No.: US 7,512,961 B2
(45) Date of Patent: Mar. 31, 2009

(54) DISK CARTRIDGE, AND RECORDING AND/OR REPRODUCING DEVICE

(75) Inventor: Takashi Ohgi, Miyagi (JP)

(73) Assignee: Sony Corporation, Tokyo (JP)

( * ) Notice: Subject to any disclaimer, the term of this patent is extended or adjusted under 35 U.S.C. 154(b) by 482 days.

(21) Appl. No.: 10/546,171

(22) PCT Filed: Nov. 11, 2004

(86) PCT No.: PCT/JP2004/016770

§ 371 (c)(1),
(2), (4) Date: Aug. 18, 2005

(87) PCT Pub. No.: WO2005/066956

PCT Pub. Date: Jul. 21, 2005

(65) Prior Publication Data

US 2006/0150205 A1     Jul. 6, 2006

(30) Foreign Application Priority Data

Dec. 26, 2003   (JP) .............................. 2003-434634

(51) Int. Cl.
*G11B 23/03* (2006.01)
(52) U.S. Cl. ....................... 720/738; 720/743
(58) Field of Classification Search ................. 720/743, 720/656, 739, 738; 360/99.01, 99.02, 99.06, 360/99.07, 133
See application file for complete search history.

(56) References Cited

U.S. PATENT DOCUMENTS

| | | | | |
|---|---|---|---|---|
| 5,850,384 A * | 12/1998 | Ohmori et al. | ............... | 720/739 |
| 5,933,400 A * | 8/1999 | Kabasawa | ................... | 720/656 |
| 5,963,538 A * | 10/1999 | Koshiyouji | ................. | 720/743 |
| 5,991,129 A * | 11/1999 | Iwata et al. | ................. | 360/133 |
| 6,166,883 A * | 12/2000 | Miyata et al. | ............... | 360/133 |
| 6,236,541 B1 * | 5/2001 | Takahashi | ................... | 360/133 |
| 2003/0185146 A1 * | 10/2003 | Roberts | ...................... | 369/291 |
| 2003/0193887 A1 | 10/2003 | Tajima et al. | | |

FOREIGN PATENT DOCUMENTS

| | | |
|---|---|---|
| JP | 89681/1990 | 7/1990 |
| JP | 30966/1994 | 4/1994 |
| JP | 2001-52462 | 2/2001 |
| JP | 2002-56601 | 2/2002 |

* cited by examiner

*Primary Examiner*—Tianjie Chen
(74) *Attorney, Agent, or Firm*—Oblon, Spivak, McClelland, Maier & Neustadt, P.C.

(57) ABSTRACT

A disk cartridge is provided which houses an optical disk rotatably. It includes a cartridge body having formed therein a head opening through which a part of the optical disk is exposed to outside, and a shutter member supported movably on the cartridge body to uncover and cover the head opening. A first concavity is formed on a side of the cartridge body over which the shutter member slides and in a region opposite to a region where the shutter member is moved, across the head opening, a bent portion is formed along one lateral side of the shutter member to close a gap resulted between the shutter member and first concavity when the shutter member has been moved to a position to cover the head opening, and a second concavity deeper than the first concavity is formed at a part of the first concavity, adjacent to the head opening.

8 Claims, 19 Drawing Sheets

DISK CARTRIDGE, AND RECORDING AND/OR REPRODUCING DEVICE

TECHNICAL FIELD

The present invention relates to a disk cartridge in which a disk such as an optical disk or the like as an information signal recording medium is housed rotatably, and a recording and/or playback apparatus which is to use the disk cartridge.

This application claims the priority of the Japanese Patent Application No. 2003-434634, filed on Dec. 26, 2003, the entirety of which is incorporated by reference herein.

BACKGROUND ART

Conventionally, there are used many disk cartridges housing a disk-shaped recording medium such as an optical disk or the like rotatably in it and which can be loaded into a disk drive unit while holding the disk-shaped recording medium encased in it. The disk cartridge of this type houses in a body thereof a disk-shaped recording medium to protect the latter, and permits easy insertion and ejection of the disk-shaped recording medium into and out of the disk drive unit. Many of the conventional disk cartridges of this type are ones each housing a disk-shaped recording medium rotatably in a rectangular body thereof.

Note here that the disk cartridge is required to have a design as compact as possible correspondingly to the size of a disk shaped recording medium to be housed in the cartridge body. This is intended to design smaller a disk recording and/or playback apparatus using the disk cartridge and make easier handling of the disk cartridge as well as to minimize the material and manufacturing cost of the disk cartridge.

A disk cartridge designed smaller correspondingly to the size of a disk-shaped recording medium to be housed is known from the disclosure in the Japanese Patent Application Laid Open No. 353845 of 1999. This conventional disk cartridge itself is designed small by forming generally circular one lateral side thereof at which it is first inserted into the recording and/or playback apparatus. The disk cartridge disclosed in the above-mentioned Japanese Patent Application Laid Open No. 353845 of 1999 has formed in a body thereof in which an optical disk is encased a write and/or read opening (will be referred to as "write/read opening" or "head opening" hereunder) which is to be covered and uncovered by a shutter member and through which a part of the optical disk can be exposed to outside. Information signals are written to, or read from, the optical disk with an optical pickup included in a write/read head being placed to face the optical disk exposed to outside of the cartridge body through the write/read opening.

The recording and/or playback apparatus using the disk cartridge as a recording medium is designed such that with the optical pickup being moved radially of the optical disk while being kept at a distance from the disk cartridge, the signal recording area on the optical disk is scanned to write or read information signals to or from the optical disk. Since in the recording and/or playback apparatus for writing or reading information signals to or from the optical disk as above, the optical pickup is moved while being kept at a distance from the disk cartridge, it is difficult to design the apparatus thinner.

DISCLOSURE OF THE INVENTION

Problems to be Solved by the Invention

It is therefore an object of the present invention to overcome the above-mentioned drawbacks of the related art by providing a disk cartridge whose design contributes to a thinner design of a recording and/or playback apparatus which is to use the disk cartridge.

It is another object of the present invention to provide a disk cartridge which itself is compact and whose design contributes to a thinner design of a recording and/or playback apparatus which is to use the disk cartridge.

It is another object of the present invention to provide a disk cartridge which can positively protect a disk-shaped recording medium encased therein.

It is another object of the present invention to provide a disk cartridge having a shutter member improved in strength and which can positively uncover and cover a write and/or read formed in the body of the disk cartridge.

It is another object of the present invention to provide a disk cartridge in which even in case a bent portion is provided along one lateral side of the shutter member to close a gap resulted between the shutter member and first concavity when the shutter member has been moved to a position to cover the write and/or read opening, the shutter member can smoothly be moved to positively cover the write and/or read opening.

It is another object of the present invention to provide a recording and/or playback apparatus designed thin for use with the above-mentioned disk cartridge.

The above object can be attained by providing a disk cartridge including according to the present invention:

a disk;

a cartridge body housing the disk rotatably and having formed therein a write and/read opening through which a part of the disk is exposed to outside;

a shutter member supported movably on the cartridge body to uncover and cover the write and/read opening;

a first concavity formed on a side of the cartridge body over which the shutter member slides and in a region opposite to a region where the shutter member is moved, across the write and/or read opening;

a bent portion formed along one lateral side of the shutter member to close a gap resulted between the shutter member and first concavity when the shutter member has been moved to a position to cover the write and/or read opening; and a second concavity formed at a part of the first concavity, adjacent to the write and/or read opening and deeper than the first concavity.

Also the above object can be attained by providing a recording and/or playback apparatus including:

a cartridge mount on which there is mounted the above disk cartridge; and a write and/or read unit provided opposite to the write and/or read opening in the disk cartridge mounted on the cartridge mount to make write and/or read to and/or from the disk.

The above recording and/or playback apparatus further includes a shutter releasing piece to release the shutter member being in a position to cover the write and/or read opening.

In the above disk cartridge according to the present invention, since the second concavity deeper than the first concavity is provided along the write and/or read opening, so even in case the bent portion is along one lateral side of the shutter member to close a gap resulted between the shutter member and first concavity when the shutter member has been moved to a position to cover the write and/or read opening, the shutter member can smoothly be moved to positively cover the write and/or read opening.

Also, a recording and/or playback apparatus which is to use the aforementioned disk cartridge can be designed thinner.

These objects and other objects, features and advantages of the present invention will become more apparent from the following detailed description of the preferred embodiments of the present invention when taken in conjunction with the accompanying drawings.

BEST MODE FOR CARRYING OUT THE INVENTION

The present invention will be illustrated and explained in detail below concerning the embodiments of the disk cartridge according to the present invention with reference to the accompanying drawings.

Figure 1:
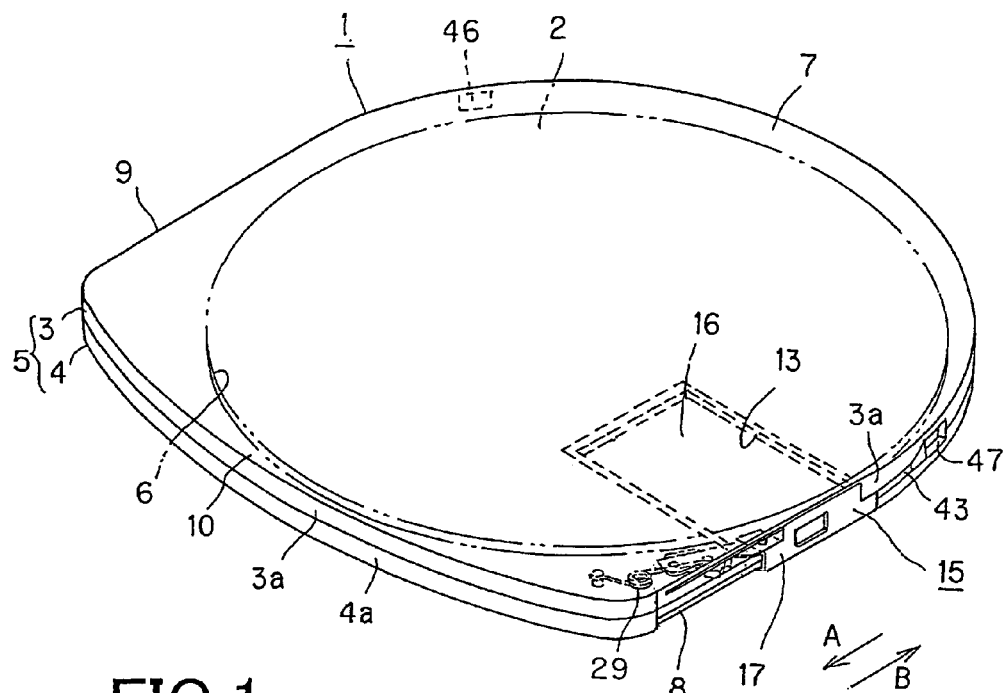
FIG. 1 is a perspective view, from an upper half, of the disk cartridge according to the present invention.
Figure 2:
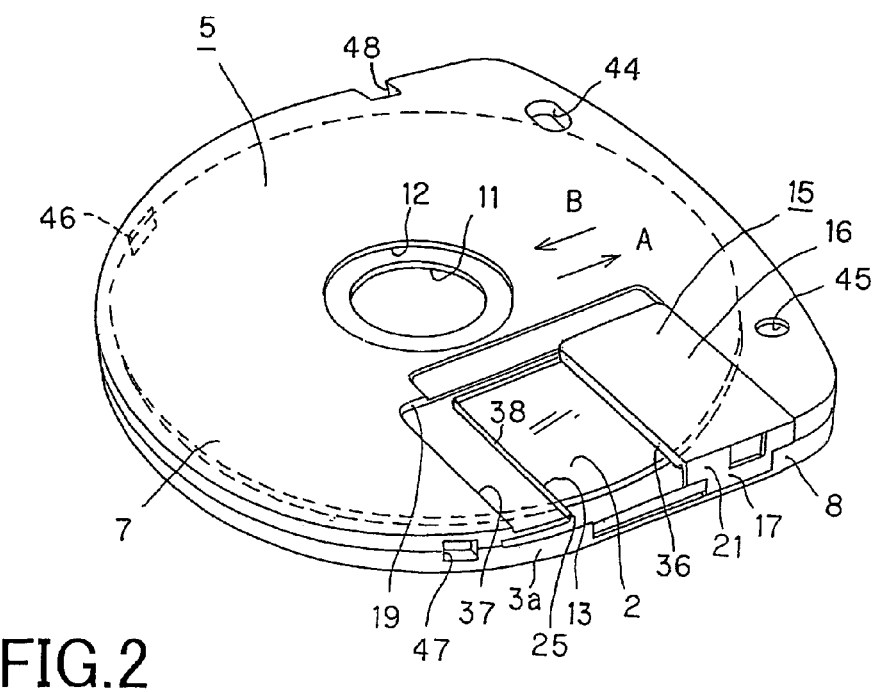
FIG. 2 is also a perspective view, from a lower half, of the disk cartridge according to the present invention.

The disk cartridge according to the present invention, generally indicated with a reference numeral 1, houses, rotatably therein, an optical disk 2 as a disk-shaped recording medium. As shown in FIGS. 1 and 2, the disk cartridge 1 includes a cartridge body 5 formed from a pair of halves, upper and lower, 3 and 4 but joined to each other so that the optical disk 2 is encased rotatably in the cartridge body 5.

The disc cartridge 1 according to the present invention houses an optical disk 2 having recorded therein program data and video data intended for playing a video game, for example. It is designed to have such an extremely compact size that it can be held in one hand. The disk cartridge 1 houses a small-diameter optical disk 2 whose diameter is on the order of 60 mm, for example.

Note here that the disk cartridge 1 illustrated and described herein is a one housing a read-only optical disk 2 having pre-recorded therein information signals such as program data or the like.

The upper and lower halves 3 and 4 of the cartridge body 5 that houses an optical disk 2 are formed from a synthetic resin to have rising peripheral walls 3a and 4a, respectively. The upper and lower halves 3 and 4 are joined together by butt joining of the rising peripheral. walls 3a and 4a to each other to define an internal disk compartment 6. Thus, the upper and lower halves 3 and 4 form together the cartridge body 5. It should be noted that the upper and lower halves 3 and 4 are joined together by joining welding projections formed on the opposite inner surfaces of the upper and lower halves 3 and 4 to each other by the ultrasonic welding or the like to form the cartridge body 5.

Figure 3:
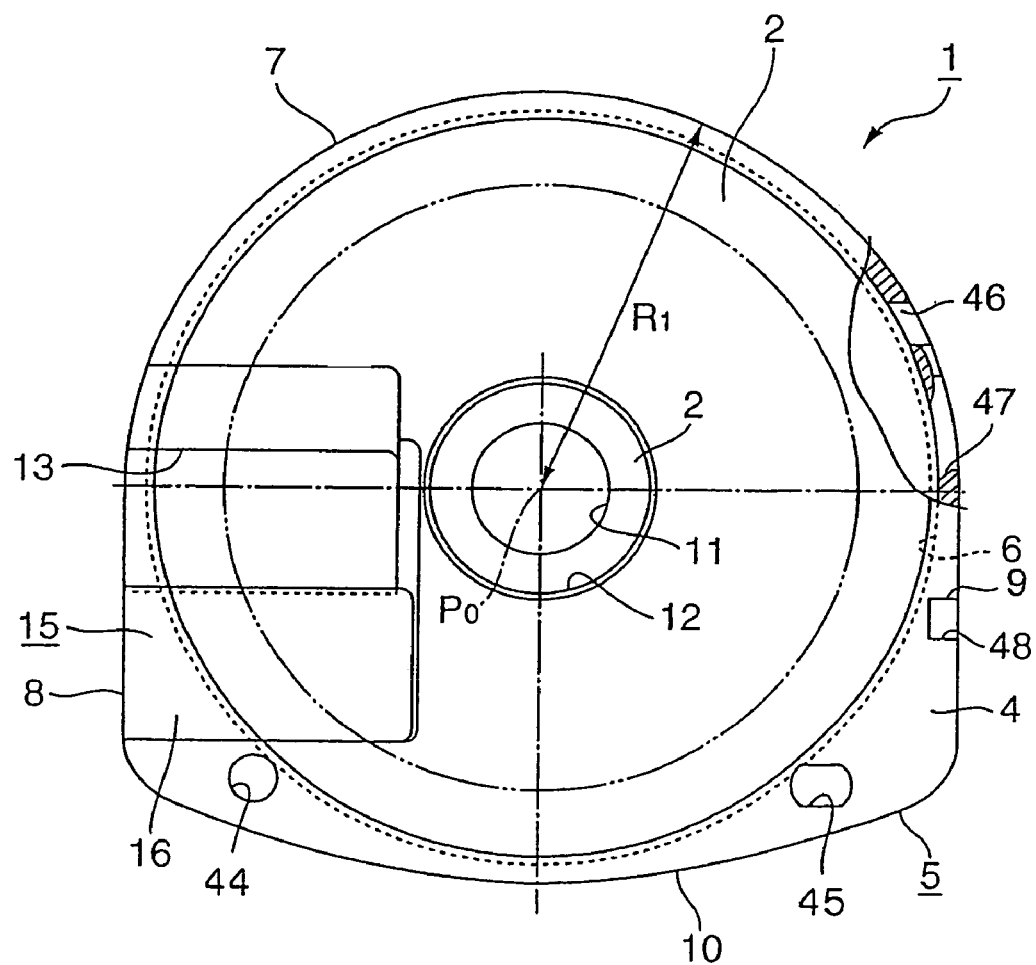
FIG. 3 is a plan view, from the lower half, of the disk cartridge according to the present invention.

As shown in FIGS. 1 to 3, one of front and rear end portions (indicated with a reference numeral 7) of the cartridge body 5 of the disk cartridge 1 is shaped circular. The disk cartridge 1 is to be inserted first at the circular front end portion 7 thereof into a disk drive unit as a recording and/or playback apparatus. As shown in FIG. 2, the circular front end portion 7 is formed to have a generally semi-circular shape whose radius is $R_1$ from a center $P_0$ coincident with the center of an optical disk 2 encased in the disk compartment 6 of the cartridge body 5. That is, the circular front end portion 7 has such a semi-circular shape as corresponds to a half of a circle defined by an optical disk 2 encased in the cartridge body 5.

The cartridge body 5 includes opposite lateral sides 8 and 9 contiguous to the circular front end portion 7 of the cartridge body 5 and parallel to each other, and a rear end portion 10 opposite to the circular front end portion 7. The rear end portion 10 is curved gently and continuously.

Since the generally semi-circular front end portion 7, as the insertion end, of the cartridge body 5 is more largely curved than the other sides, the user can easily know the direction in which the disk cartridge 1 should be directed for insertion into a slot-in type disk drive unit having a cartridge slot through which the disk cartridge 5 is to be inserted or ejected. Especially, since the disk cartridge 1 is designed so compact that it can be held in one hand, so the user can readily know, even by feeling when he or she holds the disk cartridge 1 in his or her hand, in which direction he should insert the disk cartridge 1. Therefore, the disk cartridge 1 can correctly be inserted into the disk drive unit without insertion in any wrong direction. In addition, the disk cartridge 1 can be inserted into the slot-in type disk drive unit easily and positively as will be described in detail later.

Further, because of the generally semi-circular front end portion 7 as the insertion end and the curved rear end portion 10 opposite to the circular front end portion 7, the disk cartridge 1 according to the present invention is nearly as compact as the optical disk 2 to be housed therein.

As shown in FIGS. 2 and 3, the lower half 4 of the cartridge body 5 has formed in the center thereof a circular central opening 12 through which a center hole 11 formed in the center of the optical disk 2 encased in the cartridge body 5 and its periphery are exposed to outside. There is entered into the central opening 12 a part, for example, a turn table, of a disk rotation driving mechanism provided in a disk drive unit in which the disk cartridge 1 is to be loaded.

As shown in FIGS. 2 and 3, the lower half 4, as the bottom, of the cartridge body 5 has also a write/read opening 13 (will be referred to as "head opening" hereunder) formed therein. The head opening 13 is formed along one (8) of the lateral sides 8 and 9 of the cartridge body 5 to have the form of a rectangle having a size large enough to expose a part of the signal recording area of the optical disk 2 encased in the cartridge body 5 to outside in a range between the inner and outer radii of the optical disk 2. That is, the head opening 13 is formed in the lower half 4 along the lateral side 8 which is a straight, flat side next to the circular front end portion 7 of the cartridge body 5.

Figure 4:
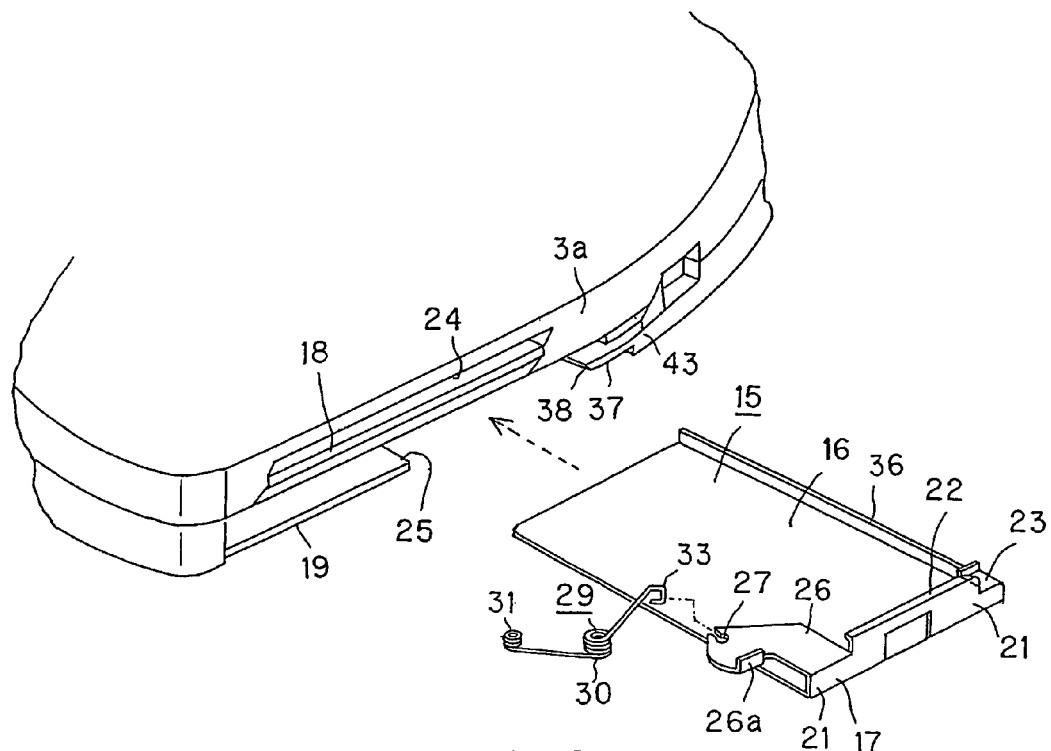
FIG. 4 is a perspective view of the shutter member and the cartridge body supporting the shutter member.
Figure 5:
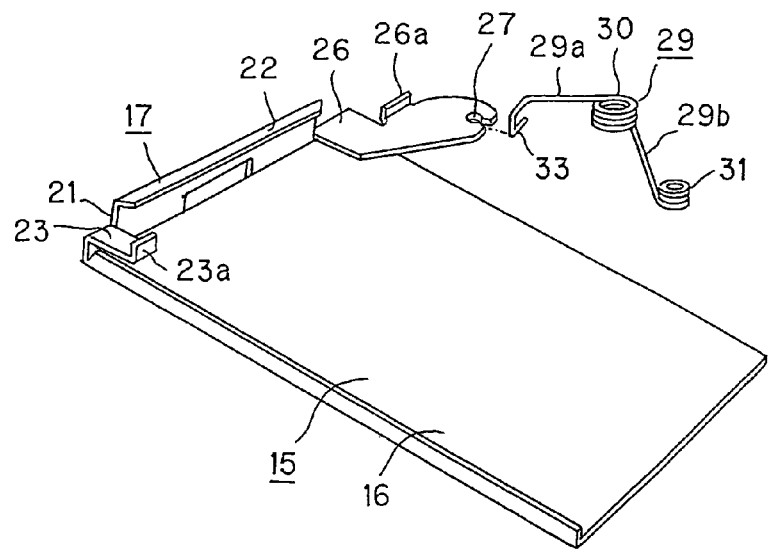
FIG. 5 is also a perspective view of the shutter member and the return helical spring installed to the shutter member.

As shown in FIGS. 4 and 5, the disk cartridge 1 has installed movably thereto a shutter member 15 to cover and uncover the head opening 13. The shutter member 15 is formed by punching a thin metal sheet and bending the punched sheet or by molding a synthetic resin. Also, the shutter member 15 includes a flat shutter portion 16 formed to have a rectangular shape large enough to cover the head opening 13 and a supporting portion 17 formed at the base end of the shutter portion 16 to have a generally horseshoe-shaped section.

Note here that the supporting portion 17 is supported on the upper half 3 of the cartridge body 5 such that the shutter member 15 is supported movably in the direction of arrow A or B shown in FIG. 1 in which it will uncover or cover the head opening 13. More specifically, the supporting portion 17 is supported on a sliding guide portion 18 formed from a part of the rising peripheral wall 3a of the upper half 3 such that the shutter member 15 can be supported movably on the cartridge body 5, as shown in FIG. 4.

As shown in FIGS. 4 and 5, the supporting portion 17 of the shutter member 15 includes a coupling portion 21 formed to rise vertically from the base end of the shutter portion 16, and a first engagement portion 22 formed along the top of the coupling portion 21 to overhang the shutter portion 16. The coupling portion 21 has provided downstream of the moving direction of the shutter member 15 a second engagement portion 23 formed in an "L" shape at a level one step lower than the first engagement portion 22. The second engagement portion 23 has a bent portion 23a formed in an "L" shape for the free end thereof to overhang the first engagement portion 22.

The coupling portion 21 has provided upstream of the moving direction of the shutter member 15 a helical-spring retainer 26 having formed therein a helical-spring hooking hole 27 in which there is hooked a hooking end portion 33 of the return helical spring 29. The helical-spring retainer 26 extends to overhang the shutter member 16. The helical-spring hooking hole 27 is generally circular and partially open. Similarly to the second engagement portion 23, the helical-spring retainer 26 has a bent portion 26a having an "L" shape. The bent portion 26a projects toward the plane of the first engagement portion 22. The hooking end portion 33 of a first arm 29a of the return helical spring 29 is inserted into the helical-spring hooking hole 27 through the partial cut and thus hooked in the helical-spring hooking hole 27, thereby coupling the shutter member 15 and return helical spring 29 to each other.

Figure 6:
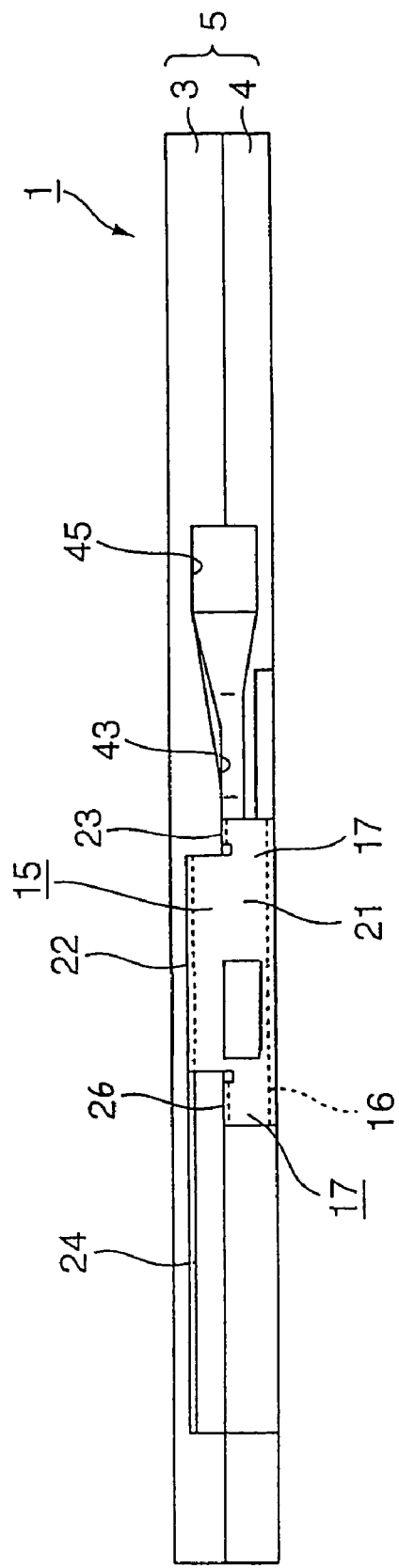
FIG. 6 is a side elevation of the disk cartridge according to the present invention, showing the side of the disk cartridge at which the shutter member is installed.
Figure 7:
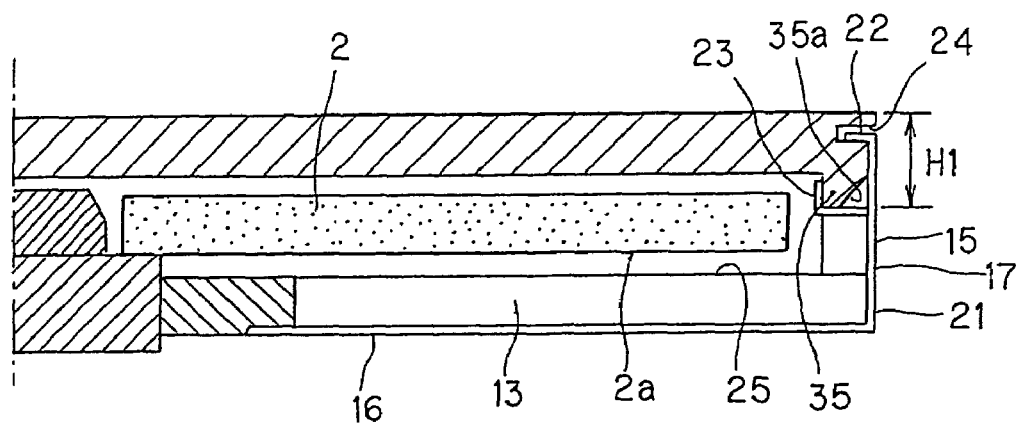
FIG. 7 is a sectional view of the shutter member installed to the cartridge body.

As shown in FIG. 2, the shutter member 15 is disposed in the cartridge body 5 to extend at the shutter portion 16 thereof over the head opening 13. At this time, the first engagement portion 22 formed atop the supporting portion 17 of the shutter member 15 is engaged in an engagement recess 24 formed in the sliding guide portion 18 as the lateral side of the upper half 3, and the L-shaped bent portions 23a and 26a formed in the "L" shape on the second engagement portion 23 and the helical-spring retainer 26 are engaged on a guide rail portion of the sliding guide portion 18, as shown in FIGS. 6 and 7. Thus, the guide rail portion of the sliding guide portion 18 is caught by the first and second engagement portions 22 and 23 of the supporting portion 17 and the helical-spring retainer 26. The shutter member 15 thus supported is guided on the sliding guide portion 18 to move in the direction of arrow A or B in FIG. 2 to uncover or cover the head opening 13.

Note that a shutter sliding concavity 19 is formed in a region of the lower half 4 where the shutter portion 16 is moved, as shown in FIG. 2. The shutter sliding concavity 19 is formed deep enough for the shutter portion 16 not to project from the surface of the cartridge body 5.

Also, the disk cartridge 1 according to the present invention is open having a cut 25 formed in a portion, opposite to the head opening 13, of the rising peripheral wall 4a of the lower half 4 as shown in FIGS. 4 and 7. That is, the head opening 13 is formed to extend from the inner radius to the outer radius of the cartridge body 5.

Also, a portion, opposite to at least the head opening 13, of the sliding guide portion 18 of the upper half 3 is formed to have such a height H1 that it will not be lower than the lower side 2a, opposite to the lower half 4, of the optical disk 2 as shown in FIG. 7 when the optical disk 2 in the disk cartridge 1 set leveled on the cartridge mount in the disk drive unit is mounted in place on the turn table.

In the disk cartridge 1 constructed as above, when the shutter member 15 is moved to uncover the head opening 13, the optical pickup as a head to read information signals recorded in the optical disk 2 can be positioned as a whole in the cartridge body 5. Also, when the optical pickup is moved to a position for scanning along the outer radius of the optical disk 2, the other optical block can be positioned outside the cartridge body 5 with positioning, in the cartridge body 5, of the objective lens which focuses a light beam which scans the signal recording area of the optical disk 2, as will be described in detail later Thus, since the disk cartridge 1 according to the present invention permits to position the optical pickup between the inner and outer radii of the cartridge body 5 while allowing it to approach the optical disk 2, so a signal recording area can be formed to extend to the outer radius of the optical disk 2 thereby increasing the recording capacity of the optical disk 2. Also, since the disk cartridge 1 permits the optical pickup to approach the optical disk 2, an objective lens having a larger numerical aperture (NA) can be used to define a smaller spot of a light beam focused on the signal recording area of the optical disk 2 thereby writing information signals to the optical disk 2 with an improved recording density. Further, since both the recording capacity and density can be improved as above, the optical disk 2 required to have only a predetermined recording capacity may be designed to have a reduced radius. Furthermore, since the disk cartridge 1 permits scanning of the optical disk 2 with the optical pickup being positioned in a range between the inner and outer radii of the cartridge body 5, so the cartridge body 5 may be designed more compact and hence the disk drive unit which is to use the disk cartridge 1 may be designed more compact.

In the disk cartridge 1 according to the present invention, the shutter member 15 to cover and uncover the head opening 13 is installed movably along the flat lateral side 8 of the cartridge body 5 as shown in FIGS. 1 and 2. Therefore, since the supporting portion 17 is movable linearly along the flat lateral side 8, the shutter member 15 can be moved stably.

Also, since the head opening 13 is formed in a position opposite to the flat lateral side 8 of the cartridge body 5, the portion of the lower half 4 having the cut 25 formed therein is straight. Therefore, even with the head opening 13 being open at that portion, where the cut 25 is formed, of the lateral side 8 of the cartridge body 5, the head opening 13 is generally rectangular and thus can positively be covered by the shutter member 15 including the supporting portion 17 having the linear horseshoe-shaped section.

Next, there will be illustrated and explained a return helical spring 29 to assure a positive movement of the shutter member 15 in a direction to uncover or cover the head opening 13 and positively hold the shutter member 15 in a position where it has uncovered or covered the head opening 13. The return helical spring 29 is pivotally engaged at one end thereof on the shutter member 15 and at the other end on the cartridge body 5. The return helical spring 29 pivots to force the shutter member 15 in either a direction to uncover or cover the head opening 13 correspondingly to a position to which the shutter member 15 has been moved in relation to the cartridge body 5.

Figure 8A:
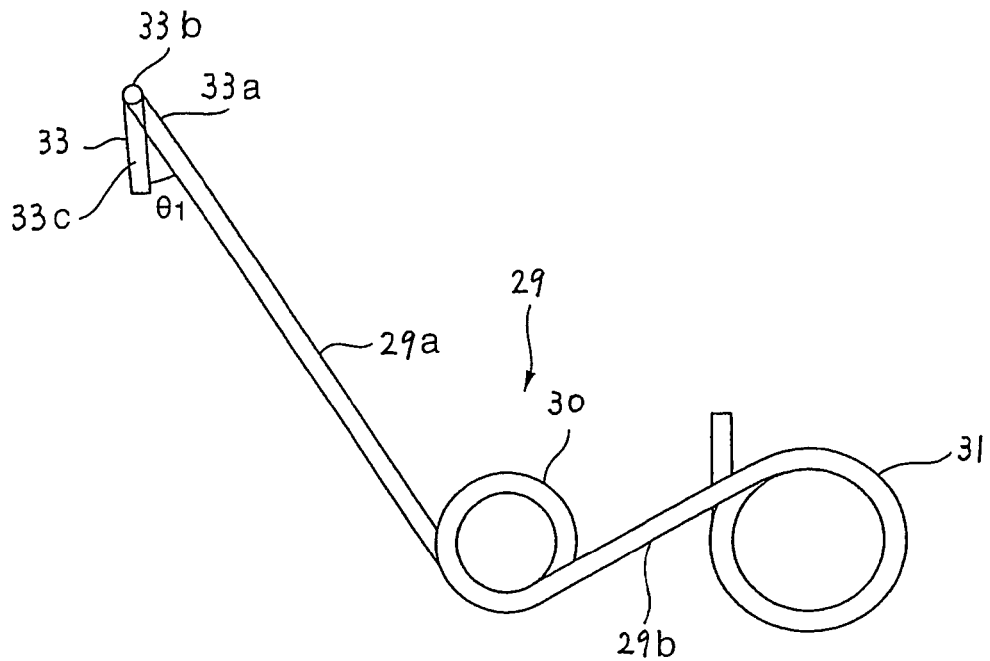
FIG. 8A is a plan view of the return helical spring forcing the shutter member.
Figure 8B:
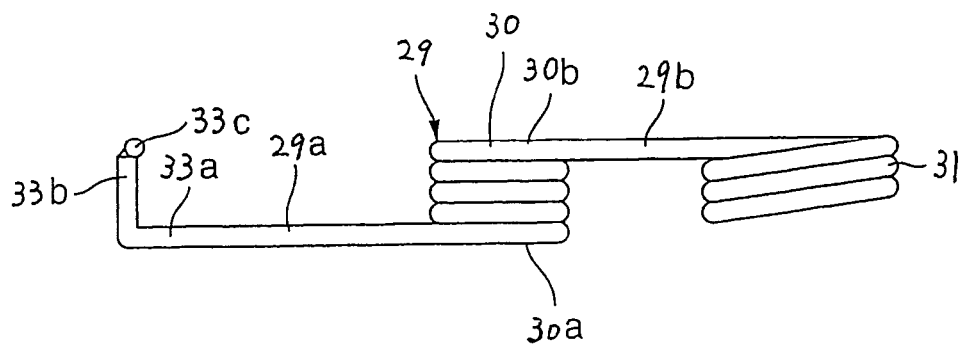
FIG. 8B is a side elevation of the return helical spring.

As shown in FIGS. 8A and 8B, the return helical spring 29 includes a first arm portion 29a to be engaged on the shutter member 15 by a first coil portion 30, a second arm portion 29b supported on a part of the cartridge body 5, and a first coil portion 30 provided between the first and second arm portions 29a and 29b. The first coil portion 30 is formed by winding a plurality of times to a predetermined thickness. The first arm portion 29a extends from one thickness-directional end 30a of the first coil portion 30, and the second arm portion 29b extends from the other thickness-directional end 30b. The first coil portion 30 may be designed for various diameters, numbers of turns and free angles. However, a return helical spring should be selected which has a diameter, number of turns and free angle, all of optimum values.

The first arm portion 29a extending from the first coil portion 30 has formed at the free end thereof the hooking end portion 33 to be engaged on the shutter member 15. The hooking end portion 33 includes a portion 33a extending from the end of the first arm portion 29a, a rising portion 33b bent generally at a right angle in relation to the extending direction of the extension portion 33a in the winding direction of the first coil portion 30, and a bent portion 33c contiguous to the rising portion 33b and bent generally in parallel to the first arm portion 29a. The hooking end portion 33 has thus a generally horseshoe-like shape. The bent portion 33c of the hooking end portion 33 is bent at a predetermined angle $\theta_1$ in relation to the extending direction of the first arm portion 29a. The hooking end portion 33 has the rising portion 33b thereof inserted, from the cut, and hooked in the helical-spring hooking hole 27 formed in the end portion of the helical-spring retainer 26 of the shutter member 15, so that the return helical spring 29 is supported by the shutter member 15.

Figure 9:
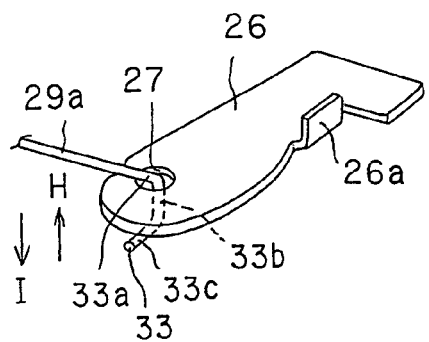
FIG. 9 is a perspective view of the return helical spring engaged on the shutter member.

Since the bent portion 33c of the hooking end portion 33 is bent at the predetermined angle $\theta_1$ in relation to the extending direction of the first arm portion 29a, the hooking end portion 33 is prevented from being unhooked from the helical-spring hooking hole 27 even when the shutter member 15 is moved to uncover or cover the head opening 13. That is, since the free end of the hooking end portion 33 is bent, the bent portion 33c of the return helical spring 29 extends under the helical-spring retainer 26 as shown in FIG. 9. Therefore, even if the return helical spring 29 is swayed in the direction of H in FIG. 9 or the shutter member 15 is swayed in the direction of arrow I in FIG. 9 while the shutter member 15 is moving to uncover or cover the head opening 13, the bent portion 33c of the hooking end portion 33 abuts the bottom of the helical-spring retainer 26, so that the return helical spring 29 and shutter member 15 can be prevented from being disengaged from each other.

Figure 10A:
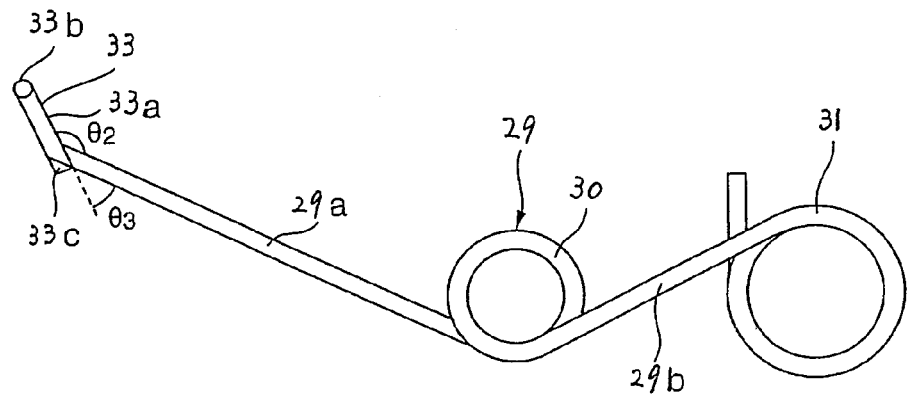
FIG. 10A is a plan view of a variant of the return helical spring forcing the shutter member.
Figure 10B:
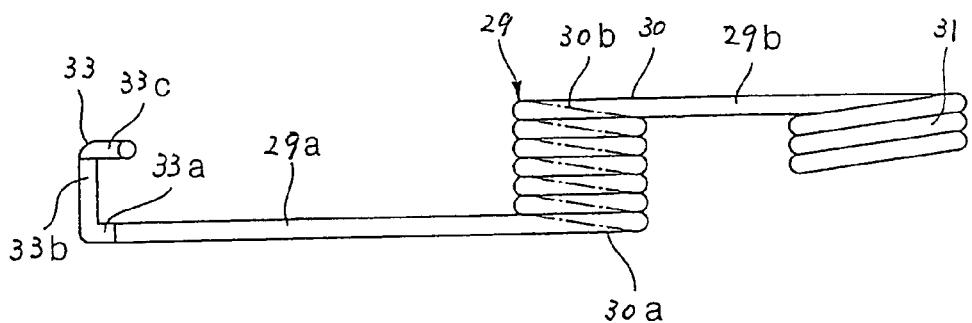
FIG. 10B is a side elevation of the return helical spring.
Figure 11:
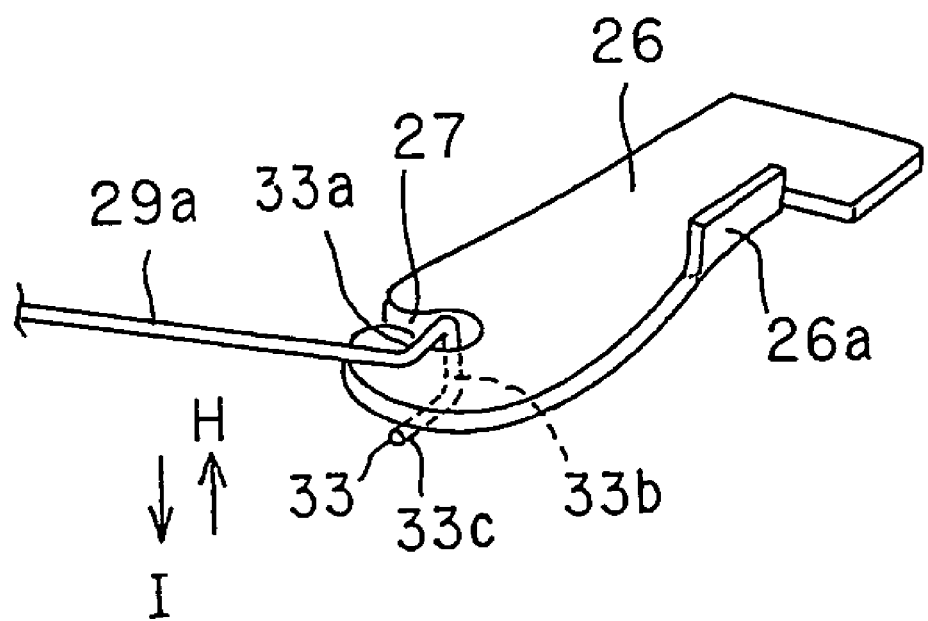
FIG. 11 is a perspective view of the return helical spring engaged on the shutter member.

Also, by forming the return helical spring 29 so that the extension portion 33a and bent portion 33c are bent to have predetermined angles $\theta_2$ and $\theta_3$, respectively, in relation to the extending direction of the first arm portion 29a as shown in FIGS. 10A and 10B, it is possible to more positively prevent the hooking end portion 33 from being unhooked from the helical-spring hooking hole 27. That is, by forming the return helical spring 29 so that the free end of the hooking end portion 33 is bent at a predetermined angle at two points, namely, at the extension portion 33a and bent portion 33c, the extension portion 33a extends over the helical-spring retainer 26 and the bent portion 33c extends under the helical-spring retainer 26 as shown in FIG. 11. Therefore, even if the return helical spring 29 or shutter member 15 is swayed vertically, namely, in the direction of arrow H or I in FIG. 11 while the shutter member 15 is moving to uncover or cover the head opening 13, the extension portion 33a of the hooking end portion 33 abuts the upper side of the helical-spring retainer 26 and the bent portion 33c abuts the lower side of the helical-spring retainer 26, so that the return helical spring 29 and shutter member 15 can be prevented from being disengaged from each other.

Figure 13:
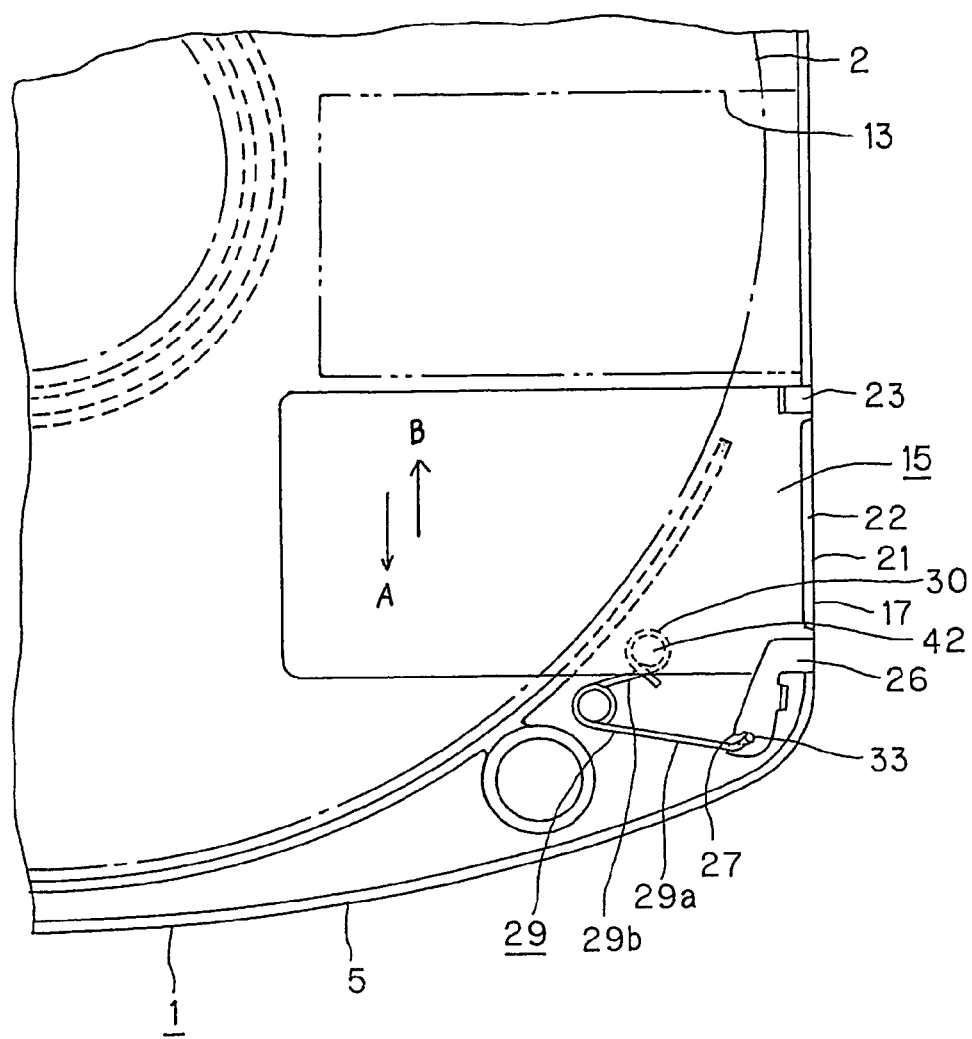
FIG. 13 is a plan view of the disk cartridge with the head opening being uncovered with the shutter member.

As shown in FIGS. 8A, 8B and 13, the second arm portion 29b of the return helical spring 29 has a second coil portion 31 by which the return helical spring 29 is pivotably engaged on the cartridge body 5. The second coil portion 31 is wound a plurality of turns in a direction opposite to the winding direction of the first coil portion 30 but in the direction of the thickness of the first coil portion 30 toward the one thickness-directional end 30a. The second coil portion 31 is pivotably installed on the supporting pin 42 projected from the inner surface of the cartridge body 5. It should be noted that the second coil portion 31 may be designed for various diameters, numbers of turns and free angles similarly to the first coil portion 30. However, a return helical spring should be selected which has a diameter, number of turns and free angle, all of optimum values.

Since the first and second coil portions 30 and 31 are wound a plurality of turns in the directions opposite to each other, so the return helical spring 29 can be formed to have a reduced entire thickness which will contribute to a thinner design of the cartridge body 5. That is, if a plurality of coil portions of the return helical spring 29 is formed by winding them in the same direction, the second coil portion 31 will be wound further from the position of the other end 30b in a direction away from the first end 30a in the direction of the thickness of the first coil portion 30. Thus, the thickness of the second coil portion 31 adds to that of the first coil portion 30, which will add to the thickness of the entire spring and thus to the thickness of the cartridge body which houses the return helical spring. This coil winding will lead to an increased thickness of the disk drive unit in which such a disk cartridge is used. In the return helical spring 29 according to the present invention, however, the first and second coil portions 30 and 31 are wound in the directions opposite to each other. Namely, the second coil portion 31 is wound in the direction of the one end 30a of the first coil portion 30, so that the return helical spring 29 can be formed to have the entire thickness thereof limited to the thickness of the first or second coil portion 30 or 31.

Figure 12:
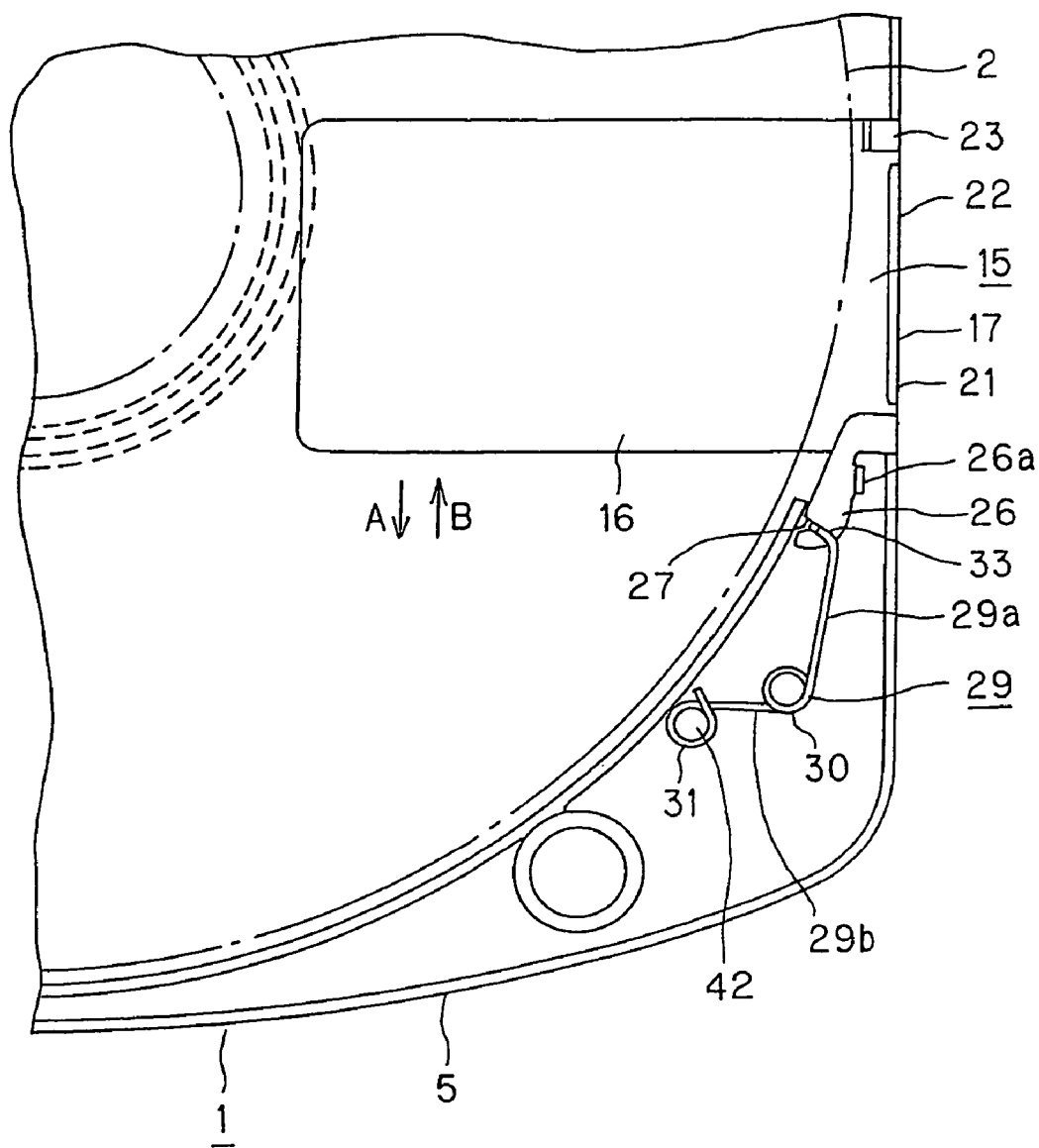
FIG. 12 is a plan view of the disk cartridge with the head opening (write/read opening) being covered with the shutter member.

As shown in FIG. 12, the return helical spring 29 is disposed in a position to which the shutter member 15 is moved to uncover the head opening 13. That is, the return helical spring 29 is disposed upstream of a direction in which the shutter member 15 moves from a position to cover the head opening 13 toward a position to uncover the head opening 13.

Note that since the shutter member 15 leaves the head opening 13 when it moves in the upstream direction, disposition of the return helical spring 29 in that upstream direction permits to prevent the return helical spring 29 from projecting into the head opening 13 uncovered by the shutter member 15. Thus, the head opening 13 can be uncovered widely.

Further, according to the present invention, the upstream side of the moving direction of the shutter member 15 is at the rear corner of the disk cartridge 1, opposite to the side at which the disk cartridge 1 is first inserted into the disk drive unit. Namely, the upstream side of the moving direction is sufficiently spatial to permit efficient disposition of the return helical spring 29 in the cartridge body 5.

When the return helical spring 29 is in the position for the shutter member 15 to cover the head opening 13, the return helical spring 29 is forcing the shutter member 15 in the direction of arrow B in FIG. 12 to keep covering the head opening 13. When the disk cartridge 1 is inserted into the disk drive unit and then loaded into the cartridge holder, a shutter releasing piece provided at the disk drive unit enters a guide recess 43 formed in the lateral side 8 of the cartridge body 5 and abuts a coupling portion 21 of the shutter member 15 from downstream of the moving direction of the shutter member 15. So, the shutter member 15 will be limited from moving in the direction of insertion and moved in relation to the cartridge body 5 in the direction of arrow A in FIG. 12 in which it will uncover the head opening 13. Thus, the first coil portion 30 formed at a non-fixed center of the return helical spring 29 is moved about a supporting pin 42 on which the second coil portion 31 is pivotably engaged and in the direction of arrow A in which the shutter member 15 is moved. When the first coil portion 30 is further moved in the direction of arrow A and goes over the position of the supporting pin 42 located along the moving direction of the shutter member 15, the return helical spring 29 will start forcing in an opposite direction. When the forcing direction is reversed, the return helical spring 29 will force the shutter member 15 to move in the direction of arrow A in FIG. 13 to uncover the head opening 13, and hold the shutter member 15 in the position to uncover the head opening 13.

When an eject operation is made at the disk drive unit to eject the disk cartridge 1 in which the shutter member 15 is being held in the position to uncover the head opening 13, the shutter member 15 will be moved in relation to the cartridge body 5 in the direction of arrow B in FIG. 12 and the central first coil portion 30 is also moved in the same direction of arrow B. This movement is opposite to that made when the disk cartridge 1 is inserted into the disk drive unit. When the shutter member 15 is further moved in the direction of arrow B and the first coil portion 30 goes over the position of the supporting pin 42 located in the position toward which the shutter member 15 will be moved, the return helical spring 29 will start forcing in an opposite direction. When the forcing direction is reversed, the return helical spring 29 will force the shutter member 15 in the direction of arrow B in FIG. 13, thus move the shutter member 15 in the direction to cover the head opening 13 and hold the shutter member 15 in the position to cover the head opening 13.

Being thus forced by the return helical spring 29, the shutter member 15 is held, under the force of the return helical spring 29, in each of positions to cover and uncover the head opening 13. Namely, the head opening 13 can positively be kept covered or uncovered.

The hooking end portion 33 formed at the end of the first arm portion 29a of the return helical spring 29 is bent at the free end thereof, so that the bent portion 33c extends under the helical-spring retainer 26. When the return helical spring 29 is swayed in the direction of arrow H in FIG. 9 or when the shutter member 15 is swayed in the direction of arrow I in FIG. 9, while the shutter member 15 is being moved to uncover or cover the head opening 13, the bent portion 33c of the hooking end portion 33 will abut the bottom of the helical-spring retainer 26. Thus, the return helical spring 29 and shutter member 15 can be prevented from being disengaged from each other due to such swaying.

Also, by forming the hooking end portion 33 of the return helical spring 29 so that it is bent at two points, that is, at the extension portion 33a and bent portion 33c, to form predetermined angles, respectively, the extension portion 33a extends over the helical-spring retainer 26 while the bent portion 33c extends under the helical-spring retainer 26, as shown in FIG. 11. Therefore, even if the return helical spring 29 or shutter member 15 is swayed vertically, namely, in the direction of arrow H or I in FIG. 11, while the shutter member 15 is uncovering or covering the head opening 13, the extension portion 33a of the hooking end portion 33 abuts the upper side of the helical coil retainer 26 while the bend portion 33c abuts the lower side of the helical-spring retainer 26. Thus, the return helical spring 29 and shutter member 15 are prevented from being disengaged from each other.

On the other hand, since the disk drive unit using this disk cartridge 1 does not need any mechanism to hold the shutter member 15 in a position to uncover the head opening 13 against the force of a forcing member, so the disk drive unit can be designed more simple in mechanism and more compact.

Further, in the disk cartridge 1 according to the present invention, the shutter member 15 is moved by the return helical spring 29 in the direction to uncover or cover the head opening 13 formed in the cartridge body 5 correspondingly to its position relative to the head opening 13. So, the head opening 13 can positively be uncovered or covered in connection with insertion or ejection of the disk cartridge 1 into or from the disk drive unit.

Moreover, in the disk cartridge 1, the shutter member 15 is forced by the return helical spring 29 to move in the direction to uncover the head opening 13. Thus, it is not necessary to provide any over-stroke area for moving the shutter member 15 to the position to uncover the head opening 13. The area for moving the shutter member 15 may be smaller and thus the disk cartridge 1 itself can be designed more compact.

Note that in the disk cartridge 1 according to the present invention, there in formed in one (8) of the lateral sides of the cartridge body 5, at which the shutter member 15 is provided, the guide recess 43 a shutter member releasing member 63 provided at the disk drive unit enters, as shown in FIGS. 1 and 6.

Figure 14:
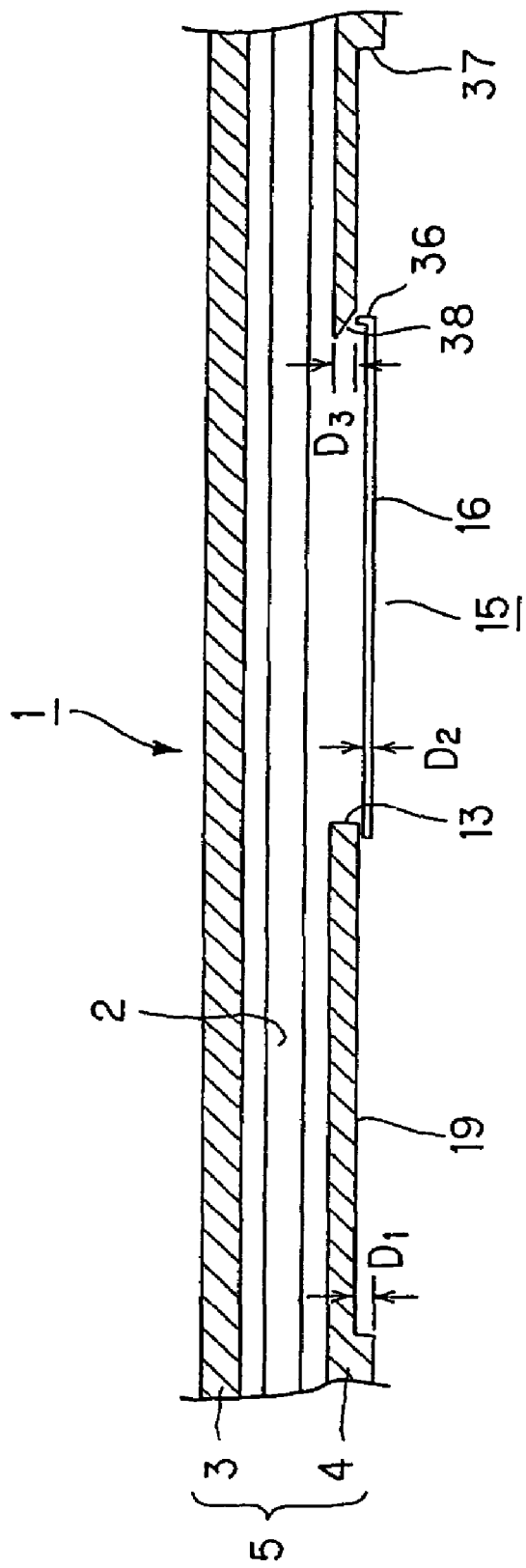
FIG. 14 is a sectional view showing the head opening formed in the cartridge body being covered with the shutter member.

Note here that a shutter sliding concavity 19 is formed in a region of the lower half 4 of the cartridge body 5 where the shutter portion 16 is moved as shown in FIG. 14. The shutter sliding concavity 19 is formed to have a depth $D_1$ that is nearly equal to a thickness $D_2$ of the shutter portion 16 of the shutter member 15, which is intended for having the shutter portion 16 extend over the cartridge body 5 without permitting the shutter portion 16 not to protrude from the surface of the cartridge body 5. Thus, the surface of the cartridge body 5 is made flat.

On the surface of the lower half 4 of the cartridge body 5, on which the shutter member 15 slides, there is further formed a first concavity 37, bottomed to be contiguous to one side of the head opening 13. The first concavity 37 is formed at a side of the lower half 4 across the head opening 13, opposite to the shutter sliding concavity 19 and longitudinally of the head opening 13. The first concavity 37 is formed to have a depth $D_3$ larger than the depth $D_1$ of the shutter sliding concavity 19, which is intended to allow a larger entry of an optical pickup included in a write and/or read head of a recording and/or playback apparatus.

At one side of the shutter portion 16 of the shutter member 15 used in the present invention, that covers the head opening 13, there is formed a bent portion 36 which closes a space formed between the shutter portion 16 and first concavity 37 when the shutter member 15 has been moved to the position to cover the head opening 13, as shown in FIG. 7.

As above, the bent portion 36 formed at the one side of the shutter portion 16 can close the space formed between the shutter portion 16 and first concavity 37 when the shutter member 15 used in the disk cartridge 1 according to the present invention has been moved to the position to cover the head opening 13, as shown in FIG. 14. So, the head opening 13 can be sealed to prevent dust or the like from entering the cartridge body 5 through the head opening 13. Thus, the optical disk 2 encased in the cartridge body 5 can be protected positively.

Figure 15:
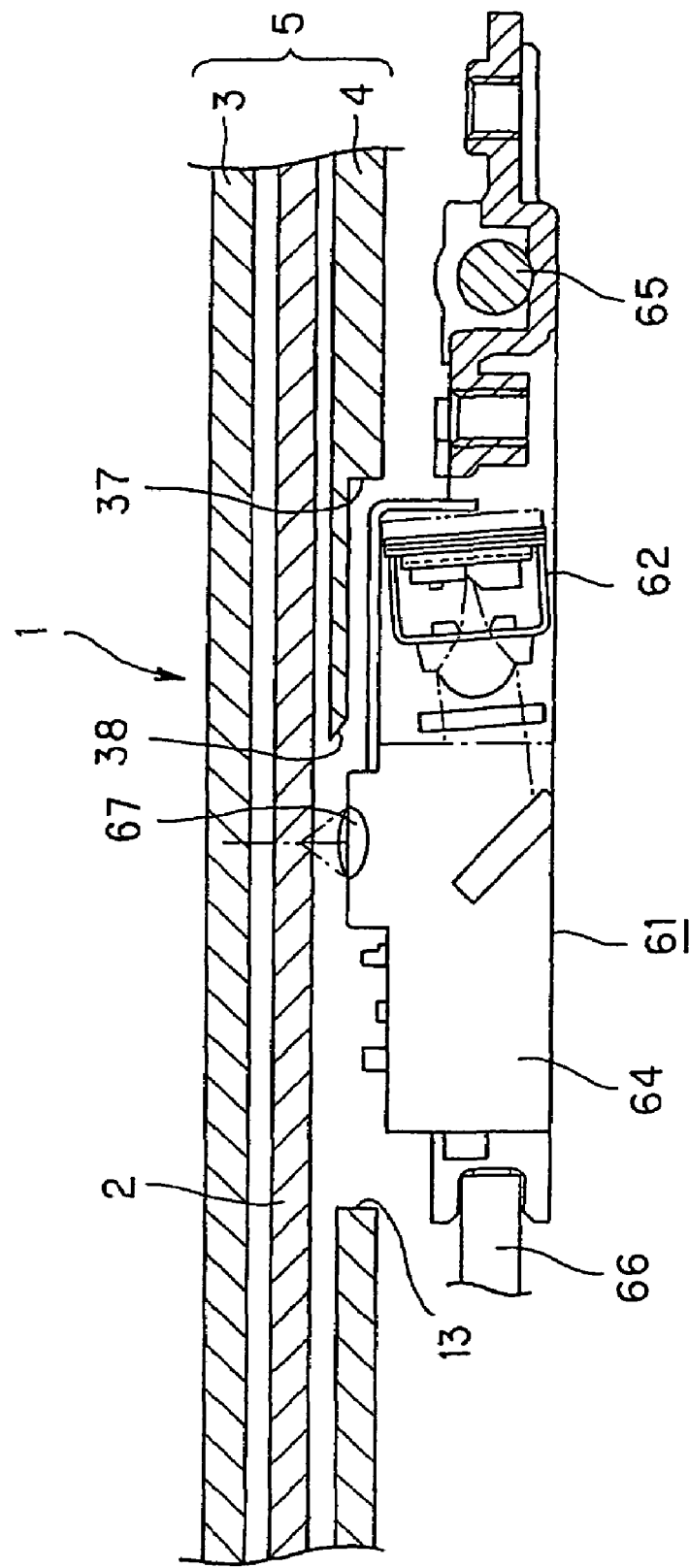
FIG. 15 is a sectional view of the disk cartridge according to the present invention, loaded in the recording and/or playback apparatus.

When loaded in a recording and/or playback apparatus, the disk cartridge 1 constructed as above according to the present invention allows a part of an optical pickup 61 included in the head used to read information signals recorded in the optical disk 2 to enter the first concavity 37 as shown in FIG. 15.

As shown in FIGS. 14 and 15, at the end of the first concavity 37, facing the head opening 13, there is formed a second concavity 38 contiguous to the first concavity 37. The second concavity 38 is formed, for example, by chamfering the inner end of the bottom of the first concavity 37 from the side facing the shutter portion 16. While the shutter portion 16 is covering the head opening 13, the second concavity 38 overlaps the longitudinal edge of the shutter portion 16 to prevent dust or the like from entering the cartridge body 5 from a gap which would take place between the head opening 13 and shutter portion 16.

Figure 16:
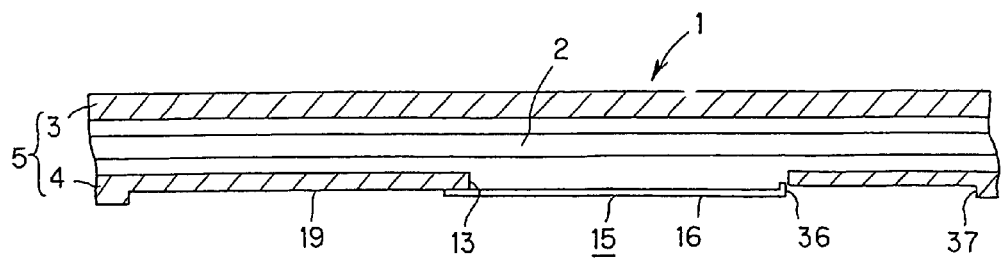
FIG. 16 is a sectional view of the disk cartridge according to the present invention.

Note here that the shutter portion 16 formed from a thin metal sheet or a synthetic resin possibly warp during molding or use of the shutter member 15. Also, the bottom portion of the lower half 4, where the first concavity 37 is formed, possibly warps because it is formed thinner than the rest of the lower half 4. If the shutter portion 16 warps toward the bottom of the first concavity 37 and/or if the bottom of the first concavity 37 warps toward the shutter portion 16, the bent portion 36 and end of the first concavity 37 will possibly collide with each other with the result that the shutter portion 16 will not be able to cover the head opening 13, as shown in FIG. 16. If the shutter portion 16 cannot fully cover the head opening 13, there will develop between the shutter portion 16 and head opening 13 a gap from a foreign matter such as dust or the like will possibly enter the cartridge body 5. Further, when the shutter portion 16 uncovers or covers the head opening 13, the bent portion 36 thereof is in friction with the bottom of the first concavity 37, possibly causing dust or the like. Especially, in case the shutter member 15 is formed from a metal, the bent portion 36 is higher in rigidity than the lower half 4 formed from a synthetic resin and so the bottom of the first concavity 37 is easily abraded to result in dust or the like.

On this account, in the disk cartridge according to the present invention, the inner end of the bottom of the first concavity 37, that is, the upstream end of the bottom of the first concavity 37, is chamfered from the inner to outer side to form the second concavity 38 deeper than the first concavity as shown in FIG. 14 so as to overlap the bottom of the first concavity 37 when the latter covers the head opening 13.

Figure 17:
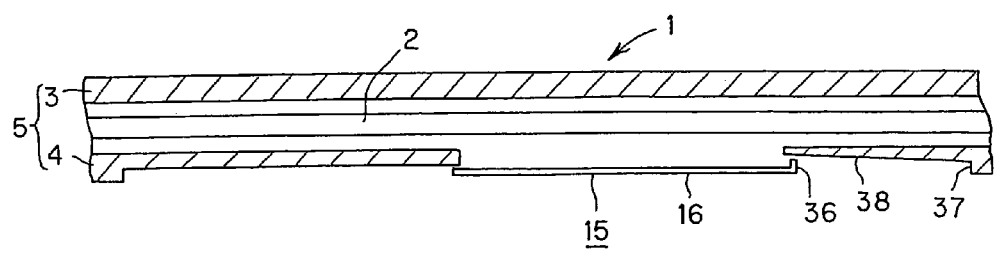
FIG. 17 is a sectional view for explanation of a variant of the second concavity.
Figure 18:
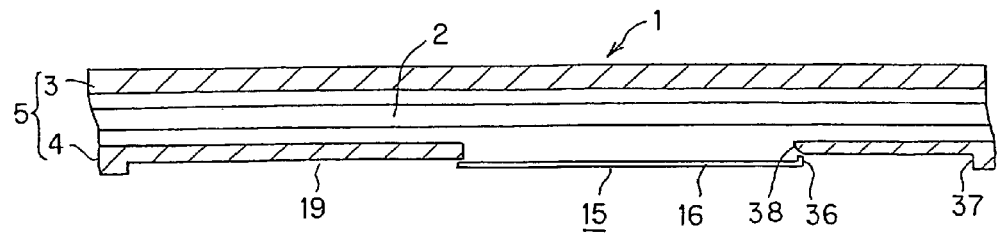
FIG. 18 is a sectional view for explanation of another variant of the second concavity.

Note that the second concavity 38 may be formed as a slope descending from the inner to outer side generally over the bottom of the first concavity 37 as shown in FIG. 17. Alternately, the second concavity 38 may be formed by rounding the inner end of the bottom of the first concavity 37 as shown in FIG. 18.

Also, there are provided on the bottom of the cartridge body 5 and at both sides of the curved rear end portion 10 first and second positioning holes 44 and 45 in which positioning pins provided at the disk drive unit are engaged, as shown in FIGS. 2 and 3. It should be noted that the positioning hole 45 is formed as an elongated hole whose width-directional diameter perpendicular to the moving direction of the shutter member 15 is taken as the major axis in order to adjust the engagement position of the positioning pin.

Also, at the opposite lateral sides 8 and 9 of the circular front end portion 7 of the cartridge body 5, there are provided loading engagement concavities 46 and 47, respectively, in which there is engaged a part of a cartridge loading mechanism provided at the disk drive unit in which the disk cartridge 1 is inserted, as shown in FIGS. 1 and 2.

Further, at a part of the circular front end portion 7, located at the other lateral side 9 of the cartridge body 5, there is provided an ejecting engagement concavity 48 in which a part of an ejecting mechanism provided at the disk drive unit is engaged, as shown in FIG. 2.

Furthermore, on the lateral sides 8 and 9, or on the bottom, of the cartridge body 5, there are formed an identification hole and identification concavity for identification of the type of an optical disk 2 which is encased into the disk cartridge 1.

The disk cartridge 1 constructed as above is formed by forming the upper and lower halves 3 and 4 of the cartridge body 5 by injection molding of polycarbonate or the like, housing an optical disk 2 and return helical spring 29 in place inside the upper and lower halves 3 and 4, coupling the upper and lower halves 3 and 4 to each other by but-joining to form the cartridge body 5, and then fitting the shutter member 15 into the cartridge body 5.

Figure 19:
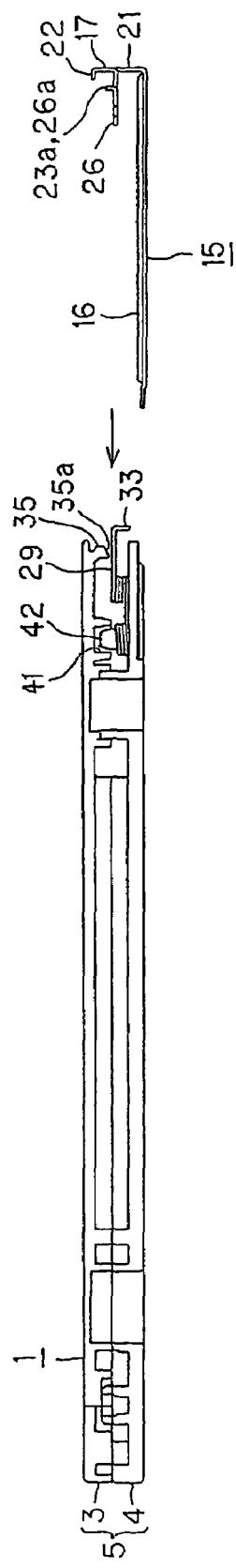
FIG. 19 shows how the shutter member is installed to the cartridge body.

More specifically, after the lower half 4 is fixed to a jig, the second coil portion 31 of the return helical spring 29 is pivotably fitted onto the supporting pin 42 provided upright on the lower half 4 as shown in FIG. 19. Then, the lower half 4 is positioned to abut the upper half 3, and the upper and lower halves 3 and 4 are joined to each other by ultrasonic welding. Thus, the cartridge body 5 is formed, the supporting pin 42 is supported on a bearing 41 formed on the upper half 3, and the return helical spring 29 is pivotably encased in the cartridge body 5. At this time, the return helical spring 29 is positioned with the hooking end portion 33 being projected out of the lateral side 8 of the cartridge body 5 on which the sliding guide portion 18 is formed.

The shutter member 15 is formed by punching and bending a thin metal sheet or molding a synthetic resin. The shutter member 15 is installed to the sliding guide portion 18 formed on the lateral side 8 of the cartridge body 5 after the hooking end portion 33 of the return helical spring 29, projecting out of the lateral side 8 of the cartridge body 5, is installed to the helical-spring retainer 26.

More particularly, the shutter portion 16 of the shutter member 15 is installed to extend on the shutter sliding concavity 19 formed in the lower half 4 with the second engagement portion 23 and helical-spring retainer 26, both formed integrally with the coupling portion 21, being placed along a taper surface 35a of a guide rail 35 formed on the upper half 3. Also, the rising portion 33b provided on the hooking end portion 33 of the return helical spring 29 is inserted, from the discontinuity of the helical-spring hooking hole 27, into the helical-spring hooking hole 27 formed in the helical-spring retainer 26 extending from the coupling portion 21, thereby coupling the shutter member 15 and return helical spring 29 with each other. Next, the shutter member 15 is slidably installed on the cartridge body 5 with the first engagement portion 22 extending from the coupling portion 21 being elastically engaged in the engagement recess 24 in the upper half 3 as well as with the bent portions 23a and 26a formed integrally with the second engagement portion 23 and helical-spring retainer 26, respectively, being placed inside the guide rail 35, as shown in FIG. 7. Here, the disk cartridge 1 is completely assembled.

As above, the return helical spring 29 and shutter member 15 are coupled with each other by inserting the rising portion 33b formed on the hooking end portion 33 of the return helical spring 29 into the helical-spring hooking hole 27 formed partially discontinuous in the helical-spring retainer 26. Namely, the shutter member 15 can easily be assembled to the cartridge body 5. Also, after the shutter member 15 is coupled with the return helical spring 29, the extension portion 33a or bent portion 33c formed on the hooking end portion 33 of the return helical spring 29 abuts the helical-spring retainer 26 to prevent the return helical spring 29 from being easily disengaged from the shutter member 15.

Next, an example of the disk drive unit to write and/or read information signals to the optical disk 2 encased in the aforementioned disk cartridge 1 will be illustrated and explained.

Figure 20:
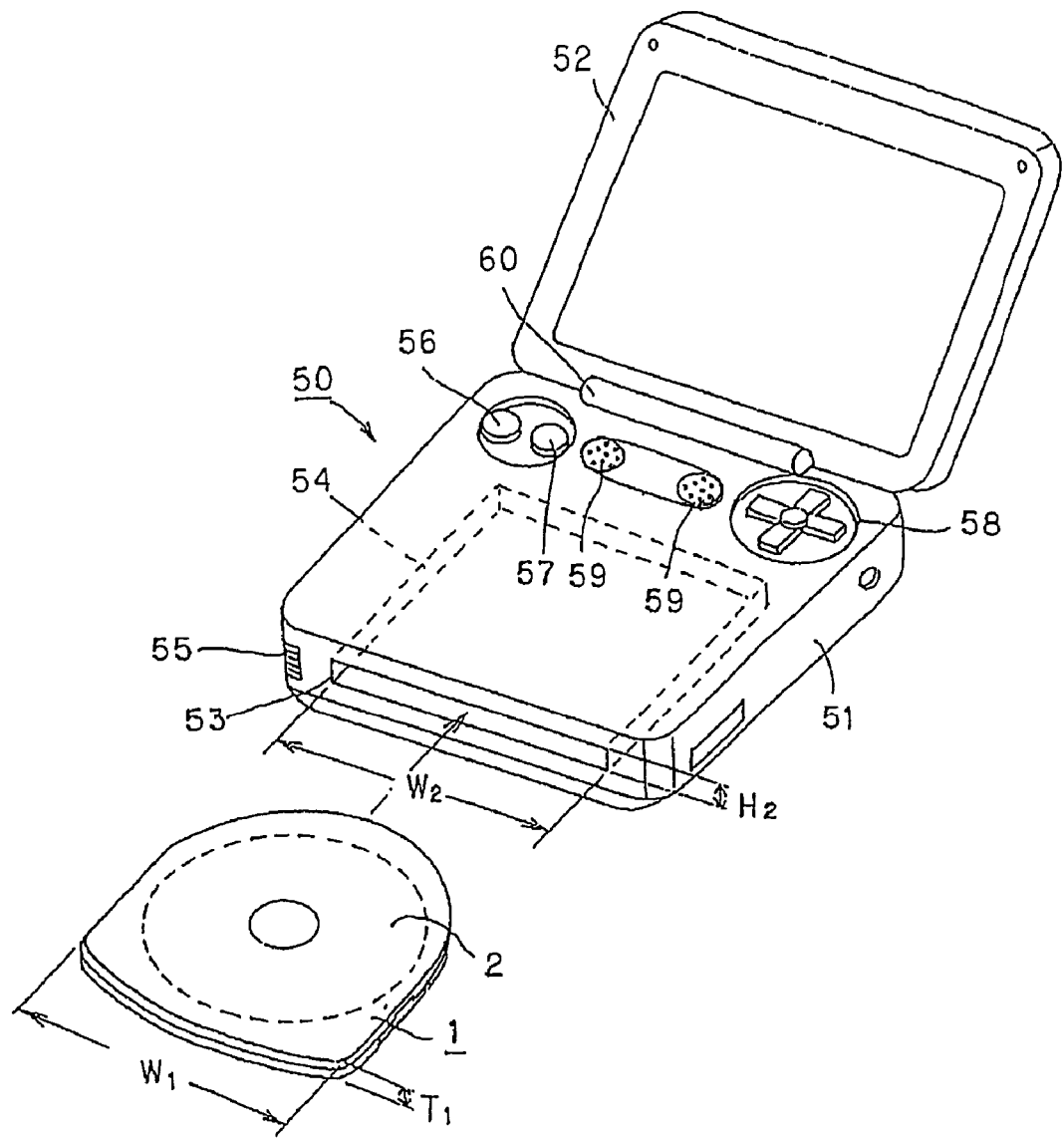
FIG. 20 is a perspective view of an example of the disk drive unit with which the disk cartridge according to the present invention is to be used.

The disk cartridge 1 according to the present invention houses an optical disk 2 having recorded therein program data and video data intended for playing a video game, for example. As shown in FIG. 20, a disk drive unit, generally indicated with a reference numeral 50, using the disk cartridge 1 housing an optical disk 2 of such a type as in the present invention, includes a unit body 51 incorporating a disk drive that reads at least data recorded in the optical disk 2 in the disk cartridge 1 loaded therein, and a display unit 52 to display image data and character data read from the optical disk 2.

The disk drive unit 50 has provided in the unit body 51 incorporating the disk drive a cartridge loading mechanism (not shown) including a cartridge holder 54 to set the disk cartridge 1 onto the disk drive. At the front side as one lateral side of the unit body 51, there is provided a cartridge slot 53 through which the disk cartridge 1 is inserted into the cartridge holder 54 and the disk cartridge 1 set on the cartridge holder 54 is ejected. The cartridge slot 53 is formed large enough to insert and eject the disk cartridge 1. It has a rectangular shape whose width $W_2$ is slightly larger than the width $W_1$ of the disk cartridge 1 to be inserted through the cartridge slot 53 and height $H_2$ is a little larger than the thickness $T_1$ of the disk cartridge 1. In the unit body 51, the cartridge holder 54 is disposed opposite to the cartridge slot 53. The unit body 51 has provided at one side of the front end face thereof an eject button 55 to eject the disk cartridge 1 held in the cartridge holder 54.

Also, the unit body 51 has provided at one side of the upper side thereof control buttons 56 and 57 used to play a video game, for example, and at the other side a control key 58 to scroll an image displayed on the display unit 52 and speakers 59 to emit audio signals reproduced from the optical disk 2. The unit body 51 has provided thereon control buttons (not shown) for controlling the disk drive, such as a read button, and a power on/off button, etc.

The display unit 52 is provided at the rear end of the unit body 51, opposite to the front end where the cartridge slot 53 is formed, and pivotably installed to the unit body 51 by a hinge mechanism 60. The display unit 52 is pivotably be installed to the unit body 51 and thus closable to the upper side of the unit body 51. The display unit 52 is formed from a liquid crystal display panel.

Next, there will be explained loading the disk cartridge 1 according to the present invention into the disk drive unit 50 constructed as above. The disk cartridge 1 is loaded into the disk drive unit 50 with the circular front end portion 7 thereof being first introduced into the cartridge slot 53 as shown in FIG. 20. It is thus inserted into the unit body 51 and held in the cartridge holder 54. Note here that as shown in FIG. 21, since the disk cartridge 1 according to the present invention is shaped to have the generally circular front end portion 7 thereof which is to first be inserted into the cartridge slot 53, the disk cartridge 1 can smoothly be inserted into the cartridge slot 53 and positively held in the cartridge holder 54 even if it is inserted with the longitudinal axis $P_2$ thereof being largely inclined in relation to the longitudinal axis $P_1$ of the cartridge slot 53.

Figure 21:
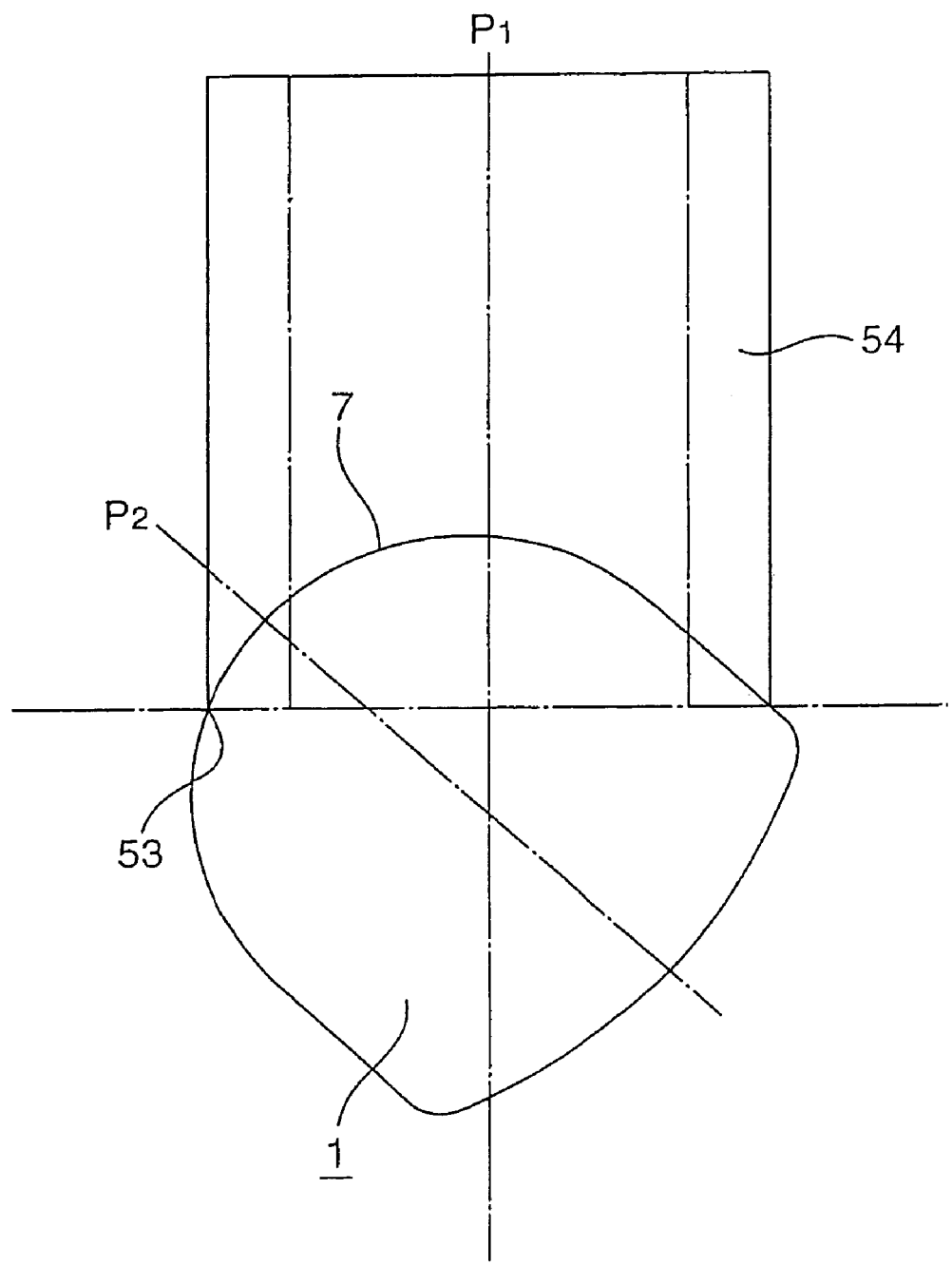
FIG. 21 is a plan view of the disk cartridge being inserted obliquely into a cartridge slot in the disk drive unit.
Figure 22:
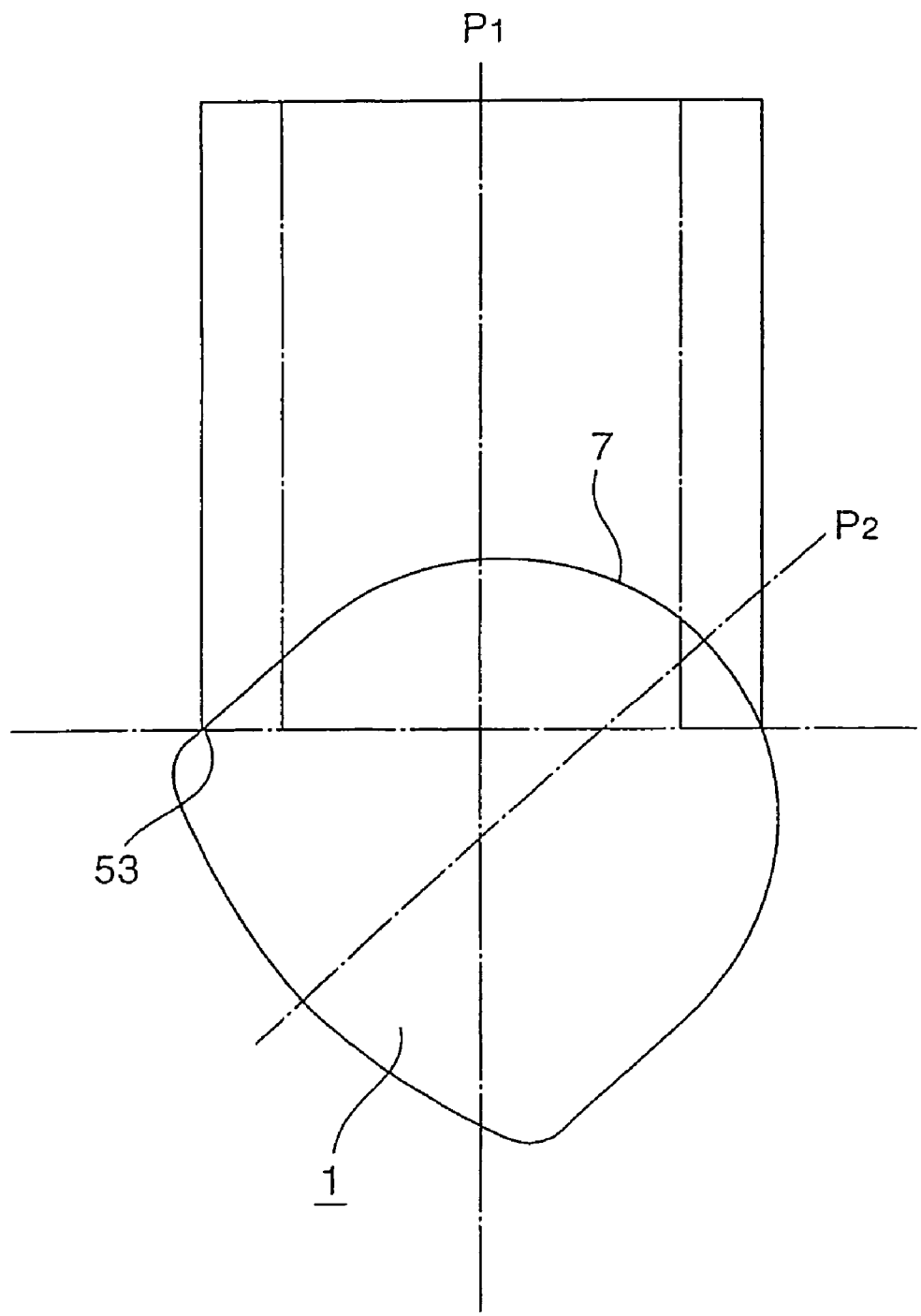
FIG. 22 is also a plan view of the disk cartridge being inserted in any other direction into the cartridge slot in the disk drive unit.
Figure 23:
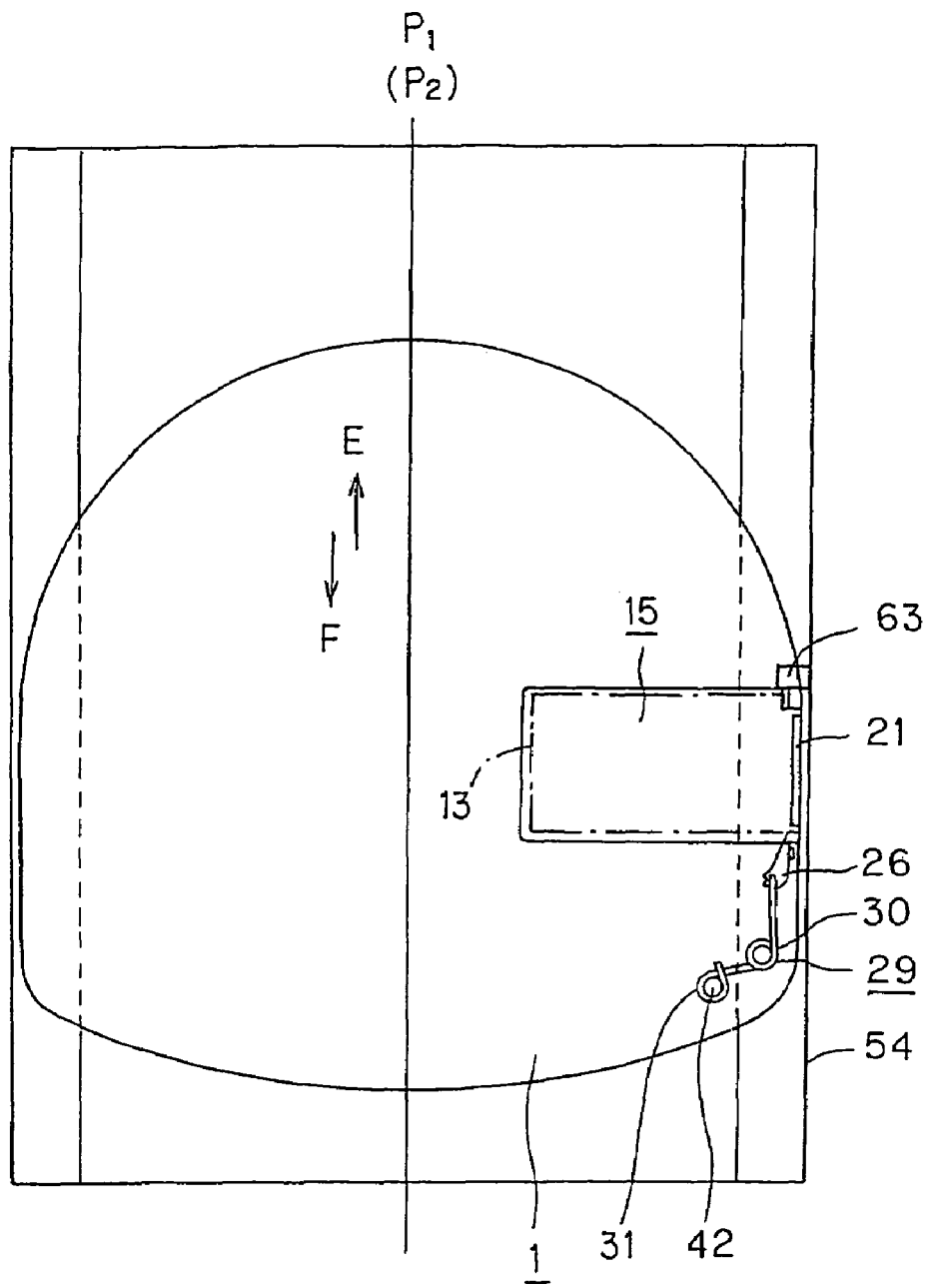
FIG. 23 is a plan view of the disk cartridge inserted under the posture control in the cartridge holder.

More specifically, since the disk cartridge 1 is shaped to have the generally circular front end portion 7, even if it is inserted into the cartridge slot 53 with the longitudinal axis $P_2$ thereof being inclined rightward or leftward to about 45 degrees in relation to the longitudinal axis $P_1$ of the cartridge slot 53, the circular front end 7 can be inserted deeply into the unit body 51 of the disk drive unit as will be known from FIG. 21 or 22. In this case, however, in the course of being inserted into the cartridge slot 53, the disk cartridge 1 can be turned about a part of the circular front end portion 7 abutting one of the side walls of the cartridge slot 53 in a direction in which the longitudinal axes $P_1$ and $P_2$ will coincide with each other as shown in FIG. 23. Thus, the disk cartridge 1 according to the present invention can positively be put into the cartridge holder 54 even it is inserted into the cartridge slot 53 in a largely inclined direction.

Then, when the disk cartridge 1 once inserted in the cartridge holder 54 is inserted deeper, the shutter member 15 is moved in relation to the cartridge body 5 until it uncovers the head opening 13. That is to say, when the disk cartridge 1 has been inserted halfway into the cartridge holder 54 as shown in FIG. 23, a shutter releasing piece 63 provided in the cartridge holder 54 moves into the guide recess 43 formed on the one lateral side (8) of the cartridge body 5 until it abuts the coupling portion 21 of the shutter member 15 from the downstream side of the moving direction of the shutter member 15.

Figure 24:
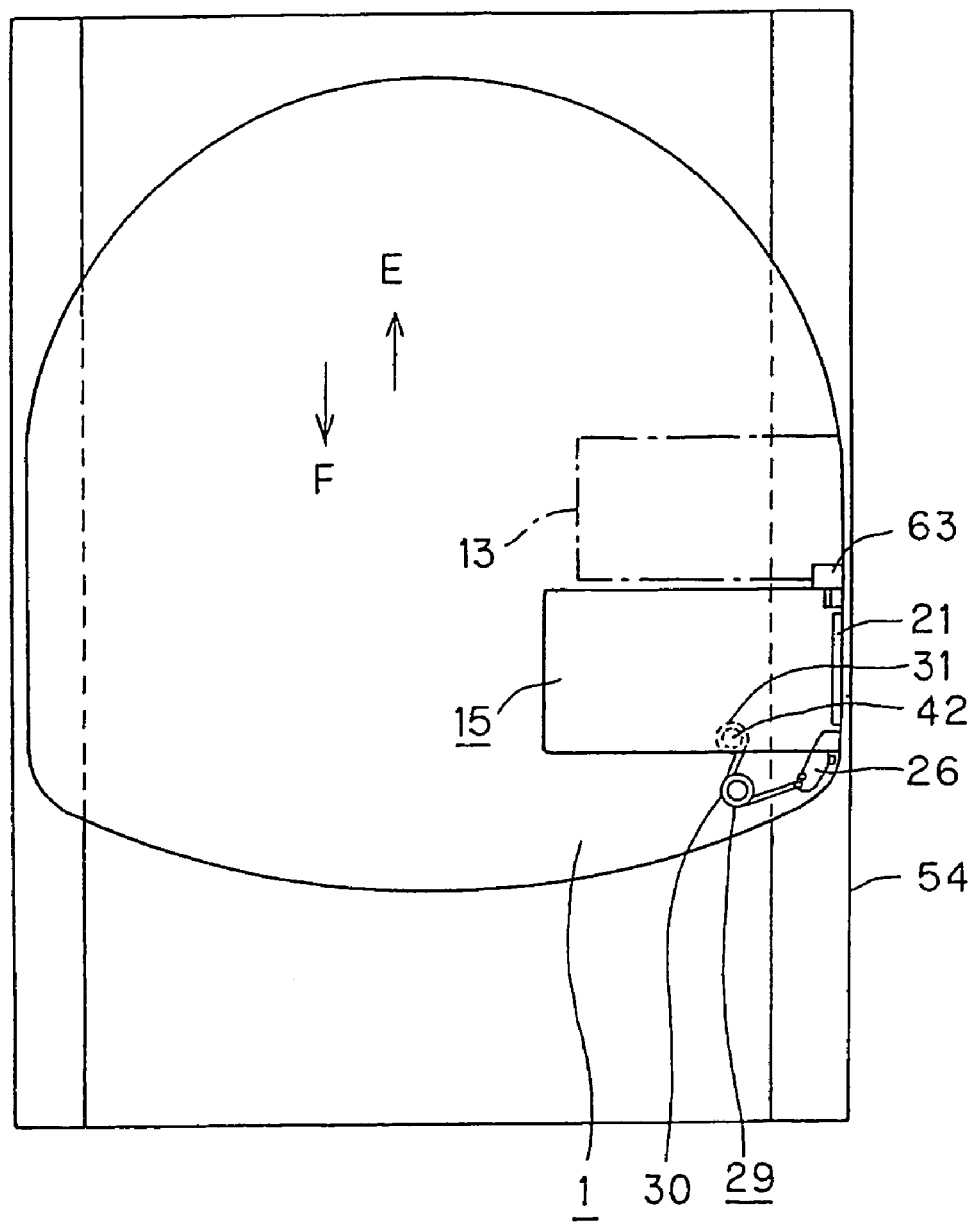
FIG. 24 is a plan view showing the head opening uncovered with the shutter member having been moved with the disk cartridge inserted in the cartridge holder.

In the disk cartridge 1, when the shutter releasing piece 63 abuts the coupling portion 21 of the shutter member 15 as above, it will limit the movement of the shutter member 15 in relation to the cartridge body 5. When the disk cartridge 1 is further inserted into the cartridge holder 54 in the direction of arrow E from the position shown in FIG. 23, the cartridge body 5 will be moved in the direction of arrow E and the head opening 13 be uncovered as shown in FIG. 24.

With the above operations, the head opening 13 is uncovered, and the disk cartridge 1 inserted in the cartridge holder 54 is mounted in place on the cartridge mount provided in the disk drive unit 50. At this time, the optical disk 2 is loaded in place in the disk drive. Here, the disk drive is driven to read program data recorded in the optical disk 2 for performance of a program.

More specifically, inside the disk drive unit 50, there are provided a disk rotation driving mechanism to rotate the optical disk 2 encased in the disk cartridge 1 set on the cartridge mount, and an optical pickup 61 that reads information signals by scanning the signal recording area of the optical disk 2 being rotated by the disk rotation driving mechanism, as will be known from FIG. 15. The optical pickup 61 includes a light source which emits a light beam to scan the signal recording area of the optical disk 2, optical elements to guide the light beam emitted from the light source to the optical disk 2, an optical block 62 incorporating a photoelectric transducer, etc. to detect return light from the optical disk 2 and thus data recorded in the optical disk, and a biaxial actuator 64 including an objective lens 67 to focus the light beam emitted from the light source onto the signal recording area of the optical disk 2.

The optical pickup 61 is supported by a sliding guide shaft 65 and guide 66 disposed in parallel to each other inside the recording and/or playback apparatus to be movable radially of the optical disk 2 encased in the disk cartridge 1 set on the cartridge mount. At this time, the optical pickup 61 is disposed with the objective lens 67 being positioned opposite to the head opening 13 in the disk cartridge 1 and the optical block 62 being positioned by the side of the head opening 13.

For reading the optical disk 2 in the recording and/or playback apparatus, the objective lens 67 can be moved into the cartridge body 5 through the head opening 13 and a part of the optical block 62 be moved into the first concavity 37 of the disk cartridge 1. As a result, the optical pickup 61 as a whole can be moved to near the disk cartridge 1 to be mounted on the cartridge mount, and thus the entire apparatus can be designed thinner.

Especially, the above physical feature will be advantageous for a recording and/or playback apparatus which is to use a disk cartridge 1 housing an optical disk 2 whose diameter is 50 mm or less. In a small disk cartridge 1, the head opening 13 is also smaller, so that the entire optical pickup 61 cannot be moved into the cartridge body 5. Especially, the optical pickup 61 including the optical block 62 and biaxial actuator 64 can hardly be designed smaller because of its construction.

With the disk cartridge 1 according to the present invention, even an optical pickup 51, which could hardly be designed sufficiently small correspondingly to the smaller design of the disk cartridge 1, is permitted to approach the disk cartridge 1 mounted on the cartridge mount. That is, the optical pickup 51 can be located with a part of the optical block 62 being moved into the first concavity 37 on the disk cartridge 1. Since the optical pickup 51 can thus be moved to near the disk cartridge 1, the recording and/or playback apparatus which is to use the disk cartridge 1 can be designed thinner.

After reading the optical disk 2, the eject button 55 is pressed to eject the disk cartridge 1 from the disk drive unit 50. When the eject button 55 is thus operated, the disk cartridge 1 mounted on the cartridge mount is ejected. The operation of cartridge ejection will not be described in detail herein. With this operation of ejection, the aforementioned operation of cartridge insertion is reversely followed to move the shutter member 15 in relation to the cartridge body 5, and the return helical spring 29 starts forcing in a direction opposite to the direction of cartridge insertion to cause the shutter member 15 to cover the head opening 13. With this movement of the shutter member 15 to the position to cover the head opening 13, the disk cartridge 1 is ejected through the cartridge slot 53. Here, the ejection of the disk cartridge 1 from the disk drive unit 50 is complete.

In the foregoing, the present invention has been illustrated and described concerning the disk cartridge shaped to have the semicircular front end portion for a more compact. However, the present invention is not limited to the aforementioned embodiment but is applicable directly to a disk cartridge including a rectangular body as well as to a disk cartridge having the head opening formed in both the upper and lower halves of the cartridge body, not in the lower half. Also in this case, the present invention can provide the similar advantages to those of the aforementioned embodiment. That is, the present invention is widely applicable to disk cartridges each including the shutter member to uncover and cover the head opening formed in the cartridge body.

Also, the aforementioned disk cartridge 1 houses a read-only optical disk 2, but the present invention is also applicable to a disk cartridge housing a writable optical disk capable of rerecording information signals or any other disk-shaped recording medium. These disk cartridges are similarly advantageous to the aforementioned embodiment.

Note that the present invention can of course be applied to a disk cartridge housing an optical disk to which information signals can be recorded, as well as to a disk cartridge housing a cleaning disk to clean the write and/or read unit of a recording and/or playback apparatus in which the disk cartridge is loaded.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A disk cartridge comprising:
   a disk;
   a cartridge body housing the disk rotatably and having formed on a lower portion of the cartridge body a write and/or read opening through which a part of the disk is exposed to outside;
   a shutter member supported movably on the lower portion of the cartridge body to uncover and cover the write and/or read opening;
   a first region and a second region formed on the lower portion of the cartridge body, the first region located across the write and/or read opening from the second region, where the second region is a region that is in contact with the shutter member when the shutter member is moved to a position which completely uncovers the write and/or read opening, and a first concavity is formed in the first region;
   a bent portion formed along one lateral side of the shutter member to close a gap resulting between the shutter member and the first concavity when the shutter member has moved to a position to cover the write and/or read opening; and
   a second concavity formed at a part of the first concavity, adjacent to the write and/or read opening and deeper than the first concavity.

2. The disk cartridge according to claim 1, wherein:
   a shutter sliding concavity is formed in the region where the shutter member is moved, on the side of the cartridge body where the shutter member slides; and a bottom of the first concavity is formed deeper than a bottom of the shutter sliding concavity.

3. The disk cartridge according to claim 1, wherein the second concavity is formed by chamfering a free end of the bottom of the first concavity.

4. The disk cartridge according to claim 1, wherein the second concavity is formed by rounding a free end of the bottom of the first concavity.

5. The disk cartridge according to claim 1, wherein the second concavity is formed from a slope extending from a base to a free end of the bottom of the first concavity.

6. A recording and/or playback apparatus, comprising:
a cartridge mount on which there is mounted a disk cartridge, the disk cartridge including
a disk;
a cartridge body housing the disk rotatably and having formed on a lower portion of the cartridge body a write and/read opening through which a part of the disk is exposed to outside;
a shutter member supported movably on the lower portion of the cartridge body to uncover and cover the write and/read opening;
a first region and a second region formed on the lower portion of the cartridge body, the first region located across the write and/or read opening from the second region, where the second region is a region that is in contact with the shutter member when the shutter member is moved to a position which completely uncovers the write and/or read opening, and a first concavity is formed in the first region;
a bent portion formed along one lateral side of the shutter member to close a gap resulted between the shutter member and first concavity when the shutter member has been moved to a position to cover the write and/or read opening; and
a second concavity formed at a part of the first concavity, adjacent to the write and/or read opening and deeper than the first concavity; and
a write and/or read unit provided opposite to the write and/or read opening in the disk cartridge mounted on the cartridge mount to make write and/or read to and/or from the disk.

7. The apparatus according to claim 6, wherein the write and/or read unit includes an optical pickup provided opposite to the disk facing the write and/or read opening, a part of the optical pickup being opposite to the first concavity during write and/or read.

8. The apparatus according to claim 6, further Comprising:
a shutter releasing piece to release the shutter member to a position covering the write and/or read opening.

* * * * *